(12) United States Patent
Kukal et al.

(10) Patent No.: US 10,783,307 B1
(45) Date of Patent: Sep. 22, 2020

(54) SYSTEM AND METHOD FOR POWER-GRID AWARE SIMULATION OF AN IC-PACKAGE SCHEMATIC

(71) Applicant: Cadence Design Systems, Inc., San Jose, CA (US)

(72) Inventors: Taranjit Singh Kukal, Delhi (IN); Balvinder Singh, Faridabad (IN); Vikas Aggarwal, Faridabad (IN)

(73) Assignee: Cadence Design Systems, Inc., San Jose, CA (US)

( * ) Notice: Subject to any disclaimer, the term of this patent is extended or adjusted under 35 U.S.C. 154(b) by 6 days.

(21) Appl. No.: 16/218,162

(22) Filed: Dec. 12, 2018

(51) Int. Cl.
| | |
|---|---|
| *G06F 30/00* | (2020.01) |
| *G06F 30/367* | (2020.01) |
| *G06F 30/327* | (2020.01) |
| *G06F 30/398* | (2020.01) |
| G06F 119/06 | (2020.01) |

(52) U.S. Cl.
CPC .......... *G06F 30/367* (2020.01); *G06F 30/327* (2020.01); *G06F 30/398* (2020.01); *G06F 2119/06* (2020.01)

(58) Field of Classification Search
CPC .... G06F 30/367; G06F 30/398; G06F 30/327; G06F 2119/06
See application file for complete search history.

(56) References Cited

U.S. PATENT DOCUMENTS

| | | | | |
|---|---|---|---|---|
| 5,297,053 | A  * | 3/1994 | Pease | G06F 30/30 700/182 |
| 6,363,515 | B1 * | 3/2002 | Rajgopal | G06F 30/33 716/105 |
| 7,617,467 | B2 * | 11/2009 | Bell | G06F 30/367 716/106 |
| 8,407,635 | B2 * | 3/2013 | Chopra | G06F 30/3323 716/105 |
| 8,539,422 | B2 * | 9/2013 | Dai | G06F 30/367 716/133 |
| 8,732,636 | B2 * | 5/2014 | Ginetti | G06F 30/367 716/106 |
| 8,949,102 | B2 * | 2/2015 | Dai | G06F 30/367 703/14 |
| 9,223,915 | B1 * | 12/2015 | Ginetti | G06F 30/327 |
| 9,881,120 | B1 * | 1/2018 | Ginetti | G06F 30/36 |
| 9,934,354 | B1 * | 4/2018 | Kukal | G06F 30/367 |
| 10,339,257 | B2 * | 7/2019 | Nojima | G06F 30/398 |

(Continued)

*Primary Examiner* — Naum Levin
(74) *Attorney, Agent, or Firm* — Mark H. Whittenberger, Esq.; Holland & Knight LLP

(57) ABSTRACT

Embodiments include herein are directed towards a method for use in an electronic design environment is provided. The method may include providing, using at least one processor, an electronic circuit design including an integrated circuit ("IC") or package schematic and generating a power distribution network ("PDN") based upon at least in part, the electronic circuit design including the IC or package. The method may further include obtaining a PDN model having one or more port mappings between one or more layout terminals and one or more schematic pin-names and stitching the PDN model and the IC or package schematic into a combined PDN and IC or package schematic model. The method may also include simulating the combined PDN and IC or package schematic model using the at least one processor.

20 Claims, 34 Drawing Sheets

(56) References Cited

U.S. PATENT DOCUMENTS

| | | | |
|---|---|---|---|
| 2007/0245285 A1* | 10/2007 | Wang | G06F 30/398 716/104 |
| 2014/0107999 A1* | 4/2014 | Frenkil | G06F 30/20 703/17 |
| 2017/0011138 A1* | 1/2017 | Venkatesh | G06F 30/327 |

* cited by examiner

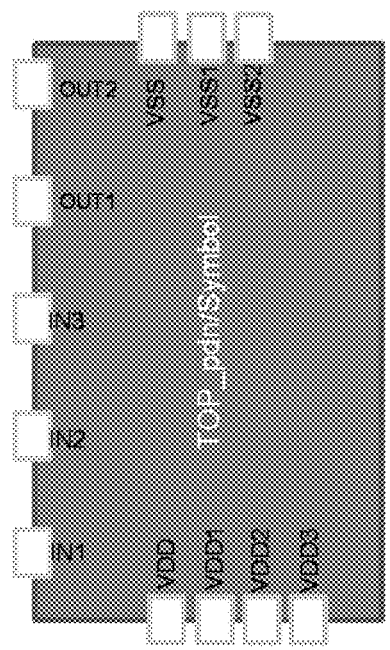
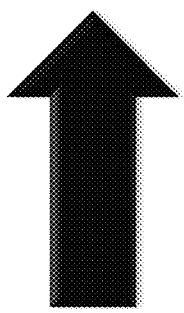
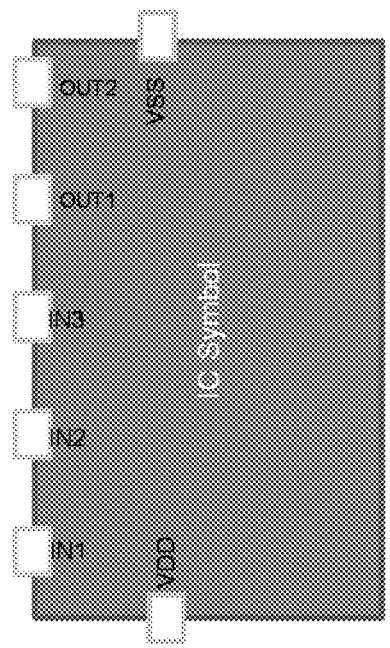
FIG. 7

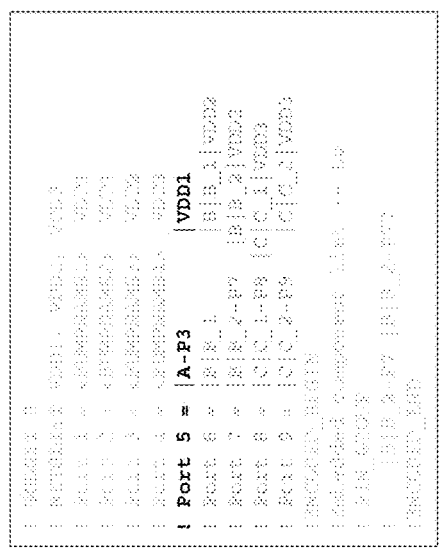
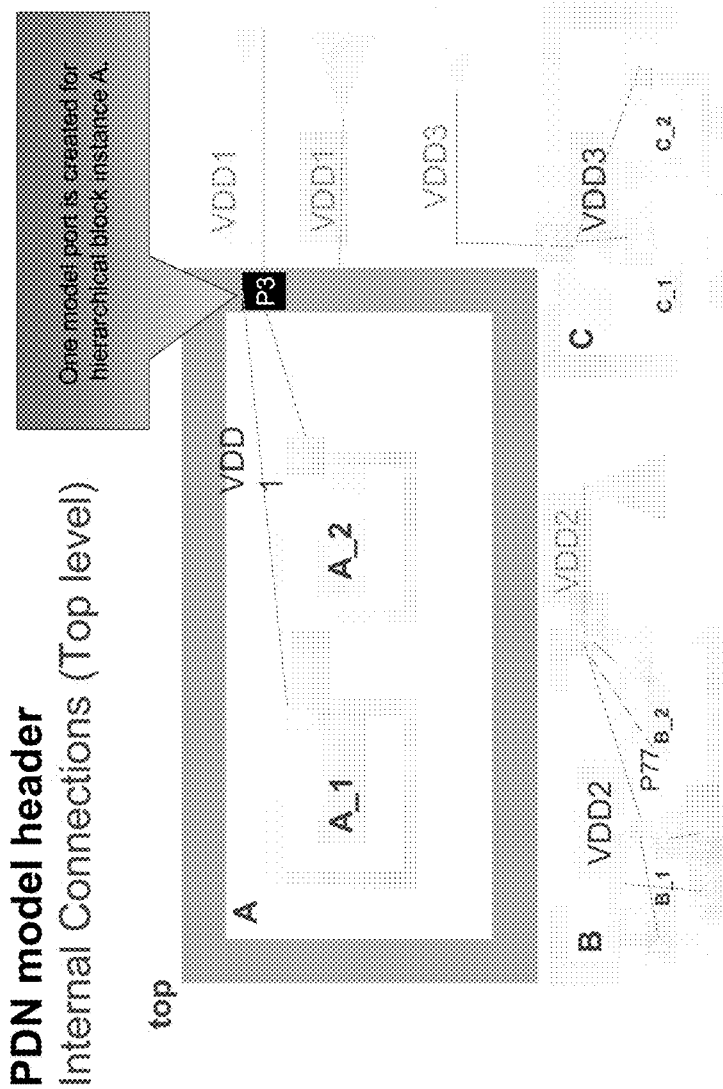
PDN model header
Internal Connections (Top level)
FIG. 21

```
! GNDNET 0
! NETSLIST VDD1 VDD2 VDD3
! Port 1 = <BUMPNAME1>   |VDD1
! Port 2 = <BUMPNAME2>   |VDD1
! Port 3 = <BUMPNAME3>   |VDD2
! Port 4 = <BUMPNAME4>   |VDD3
! Port 5 =  |A-P3        |VDD1
! Port 6 =  |B|B_1       |B|B_1|VDD2
! Port 7 =  |B|B_2-P7    |B|B_2|VDD2
! Port 8 =  |C|C_1-P8    |C|C_1|VDD3
! Port 9 =  |C|C_2-P9    |C|C_2|VDD3
!ENCODED_BEGIN
!Embedded component list -- L0
! PIN_GROUP
!    |B|B_2-P7  |B|B_2-P77
!ENCODED_END
```

- Pin-based distribution of PG
  - Each PG bump is represented as an external port in the model

- Instance level distribution of PG
  - Multiple PG connections to a component are all lumped and hence each PG connections is represented as an component entry in the header.

- Proximity driven Pin-grouping
  - Pins which are in proximity on a component are represented as a single model port and rest of the pins are made part of the PIN_GROUP

FIG. 25

SYSTEM AND METHOD FOR POWER-GRID AWARE SIMULATION OF AN IC-PACKAGE SCHEMATIC

BACKGROUND

Design engineers may often desire to simulate an IC (integrated circuit) design within the context of a system design that spans across the IC design fabric, the package design fabric, and PCB (printed circuit board) design fabric. The schematics of PCB and package may not always exist at the time of simulation. Even if the schematics of PCB and package do exist at the time of simulation, these schematics may be available in different formats for different schematic tools. As a result, these schematics may be incompatible with each other and thus cannot be simulated together without translation, transformation, compilation, etc. (collectively "transformation").

In addition, design engineers may desire to simulate this system design within the context of parasitics of the chip layout, the package layout, and the PCB layout. The parasitic-models may be extracted as combined geometries across multiple design fabrics. Some examples of such models may include on-chip spiral inductor extracted in conjunction with the package planes and traces. In some cases, complete PCB (or package) may be extracted as a single parasitic model that needs to connect to the remainder of the system. Nonetheless, it is very difficult to include parasitics from different design fabrics (e.g., different design fabrics in various layouts) in the simulation schematic.

Conventional approaches require manual creation of parasitic aware simulation schematics where a new schematic is manually created where PCB and package components are stitched into the IC schematic to create the simulation schematic. On the other hand, if PCB/package schematics are available in their native schematic editors, the user needs to copy the same schematics in the IC schematic entry tool. In some cases, if PCB/package schematics do not exist, the user has to construct new schematic by going through respective layouts to obtain the connectivity.

Existing systems often require a manual process for inserting power distribution network ("PDN") models into the schematic and require a great deal of effort in breaking all VDD/GND connections, extending or rippling (e.g., manual effort to translate global connections to local interface connections) them to top-level schematic and then inserting the model. If a user has to perform PDN aware IC simulations, he/she may need to generate a package schematic around the IC, instantiate the PDN model into the package schematic, instantiate the PDN model into each of the IC schematics being instantiated in the package, etc. They may also need to manually remove all the VDD and GND connections in both the IC and package schematics, manually, stitch appropriate points of the PDN model to corresponding power pins on instances in the package and all included IC schematics. This manual process of inserting the PDN model into a schematic is time-consuming and error-prone especially when power signals are global across the hierarchical schematic. In this way, the IC could have 100s of pins connected to power-nets. It then becomes extremely difficult to manually break those connections and map them to corresponding interfaces in the PDN model. For example, the instances could be at different level of hierarchies which makes manual work more difficult and occurrences of a block could have different supplies so each occurrence needs to be manually modified. The entire process needs to be repeated for all ICs in the package schematic and then further connected to package power-nets.

SUMMARY

In one or more embodiments of the present disclosure, a computer-implemented method for use in an electronic design environment is provided. The method may include providing, using at least one processor, an electronic circuit design including an integrated circuit ("IC") or package schematic and generating a power distribution network ("PDN") based upon at least in part, the electronic circuit design including the IC or package. The method may further include obtaining a PDN model having one or more port mappings between one or more layout terminals and one or more schematic pin-names and stitching the PDN model and the IC or package schematic into a combined PDN and IC or package schematic model. The method may also include simulating the combined PDN and IC or package schematic model using the at least one processor.

One or more of the following features may be included. The method may include identifying one or more VDD connections or GND connections associated with the IC or package schematic based upon, at least in part, the one or more schematic pin-names. The method may also include shorting the one or more VDD connections or GND connections associated with the IC or package schematic. Identifying may be based upon at least one of analyzing a hierarchical schematic or a top-level schematic. The method may further include transferring the one or more VDD connections or GND connections from the hierarchical schematic to the top-level schematic to generate an updated top-level schematic having one or more updated interfaces. The method may also include stitching the PDN model with the updated interfaces. The method may further include stitching the PDN model with one or more non-VDD connections or non-GND connections.

In one or more embodiments of the present disclosure a computer-readable storage medium having stored thereon instructions, which when executed by a processor result in one or more operations is provided. Operations may include providing, using at least one processor, an electronic circuit design including an integrated circuit ("IC") or package schematic and generating a power distribution network ("PDN") based upon at least in part, the electronic circuit design including the IC or package. Operations may further include obtaining a PDN model having one or more port mappings between one or more layout terminals and one or more schematic pin-names and stitching the PDN model and the IC or package schematic into a combined PDN and IC or package schematic model. Operations may also include simulating the combined PDN and IC or package schematic model using the at least one processor.

One or more of the following features may be included. Operations may include identifying one or more VDD connections or GND connections associated with the IC or package schematic based upon, at least in part, the one or more schematic pin-names. Operations may also include shorting the one or more VDD connections or GND connections associated with the IC or package schematic. Identifying may be based upon at least one of analyzing a hierarchical schematic or a top-level schematic. Operations may further include transferring the one or more VDD connections or GND connections from the hierarchical schematic to the top-level schematic to generate an updated top-level schematic having one or more updated interfaces. Operations may also include stitching the PDN model with the updated interfaces. Operations may further include stitching the PDN model with one or more non-VDD connections or non-GND connections.

In one or more embodiments of the present disclosure, a system for use in an electronic design environment is provided. The system may include at least one processor configured to provide an electronic circuit design including an integrated circuit ("IC") or package schematic and generating a power distribution network ("PDN") based upon at least in part, the electronic circuit design including the IC or package. The at least one processor may be further configured to obtain a PDN model having one or more port mappings between one or more layout terminals and one or more schematic pin-names and stitching the PDN model and the IC or package schematic into a combined PDN and IC or package schematic model. The at least one processor may be further configured to simulate the combined PDN and IC or package schematic model using the at least one processor.

One or more of the following features may be included. In some embodiments, the at least one processor may be further configured to short the one or more VDD connections or GND connections associated with the IC or package schematic. Identifying may be based upon at least one of analyzing a hierarchical schematic or a top-level schematic. The at least one processor may be further configured to transfer the one or more VDD connections or GND connections from the hierarchical schematic to the top-level schematic to generate an updated top-level schematic having one or more updated interfaces. The at least one processor may be further configured to stitch the PDN model with the updated interfaces.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 7 illustrates a diagram showing the generation of a PDN-aware IC schematic/symbol corresponding to one or more embodiments.

FIG. 21 illustrates a diagram showing the generation of a PDN model header to connect to internal connections at the top-level corresponding to one or more embodiments.

FIG. 25 illustrates a diagram showing the generation of a PDN model header to drive automatic connections to a PDN model corresponding to one or more embodiments.

DETAILED DESCRIPTION

Various embodiments are directed to a method, system, and computer program product for a power-grid aware simulation of an IC-Package schematic in an electronic design. Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of various embodiments, unless otherwise specifically described in particular embodiment(s) or recited in the claim(s). Where certain elements of embodiments may be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments of the invention. Further, embodiments encompass present and future known equivalents to the components referred to herein by way of illustration. More details about various processes or modules to implement various embodiments are further described below with reference to FIGS. 1-31.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Figure 1A:
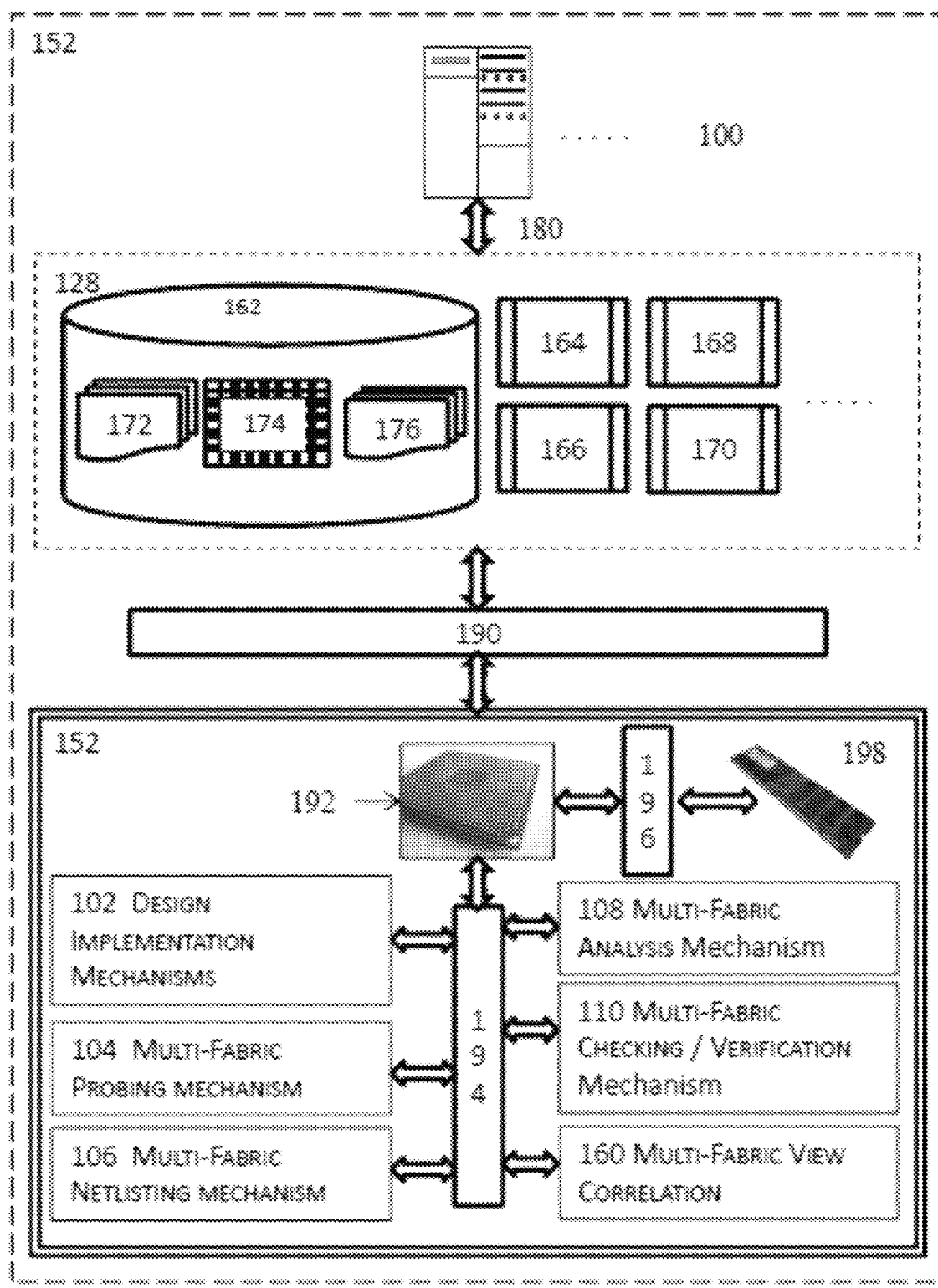
FIG. 1A illustrates a high level schematic block diagram for power-grid aware simulation of an IC-Package schematic in one or more embodiments.

FIG. 1A illustrates a high level schematic block diagrams for performing a power-grid aware simulation of an IC-Package schematic in one or more embodiments. More specifically, FIG. 1A illustrates an illustrative high level schematic block diagrams for performing a power-grid aware simulation of an IC-Package schematic and may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access, via a computer bus architecture (e.g., a system bus, a control bus, a data bus, or any combinations thereof), various resources 128 that may comprise a floorplanner, a global routing engine, and/or a detail routing engine 164, a layout editor 166, a design rule checker 168, a verification engine 170, etc.

The one or more computing systems 100 may further write to and read from a local or remote non-transitory computer accessible storage 162 that stores thereupon data or information such as, but not limited to, one or more databases (174) such as schematic design database(s) or physical design database(s), electronic circuit design specification database(s), various statistics, various data, rule decks, various design rules, constraints, etc. (172), or other information or data (176) that may be used to facilitate the performance of various functions to achieve the intended purposes.

In some embodiments, the one or more computing systems 100 may include or, either directly or indirectly through the various resources 128, invoke a set of mechanisms 152 including hardware mechanisms and software modules or combinations of one or more hardware mechanisms and one or more software modules that may comprises a plurality of design implementation modules 102 (e.g., schematic design tool, layout tool, etc.) to insert, remove, modify, improve, optimize, or otherwise operate upon designs in different fabrics (e.g., the die design fabric, the integrated circuit or IC packaging design fabric, the printed circuit board or PCB design fabric, the test bench design fabric, etc.), one or more multi-fabric probing modules 104 to probe multi-fabric designs across multiple design fabrics.

The set of mechanisms 152 may further optionally include one or more multi-fabric netlisting modules 106 to netlist multi-fabric designs across multiple design fabrics, one or more multi-fabric analysis modules 108 to simulate or analyze multi-fabric design across multiple design fabrics, one or more check or verification modules 110 to check or verify the correctness of multi-fabric designs across multiple design fabrics, and one or more multi-fabric view correlation modules 160 to correlate various symbolic views, schematic views, and/or layout views with the schematic design data or the layout data in different design fabrics at various hierarchical levels, etc.

In some embodiments, the computing system 100 may include the various resources 128 such that these various resources may be invoked from within the computing system via a computer bus 180 (e.g., a data bus interfacing a microprocessor 192 and the non-transitory computer accessible storage medium 198 or a system bus 190 between a microprocessor 192 and one or more engines in the various resources 128). In some other embodiments, some or all of these various resources may be located remotely from the computing system 100 such that the computing system may access the some or all of these resources via a computer bus 180 and one or more network components.

The computing system may also include one or more mechanisms in the set of mechanisms 152. One or more mechanisms in the set 152 may include or at least function in tandem with a microprocessor 192 via a computer bus 194 in some embodiments. In these embodiments, a single microprocessor 192 may be included in and thus shared among more than one mechanism even when the computing system 100 includes only one microprocessor 192. A microprocessor 192 may further access some non-transitory memory 198 (e.g., random access memory or RAM) via a system bus 196 to read and/or write data during the microprocessor's execution of processes.

Figure 1B:
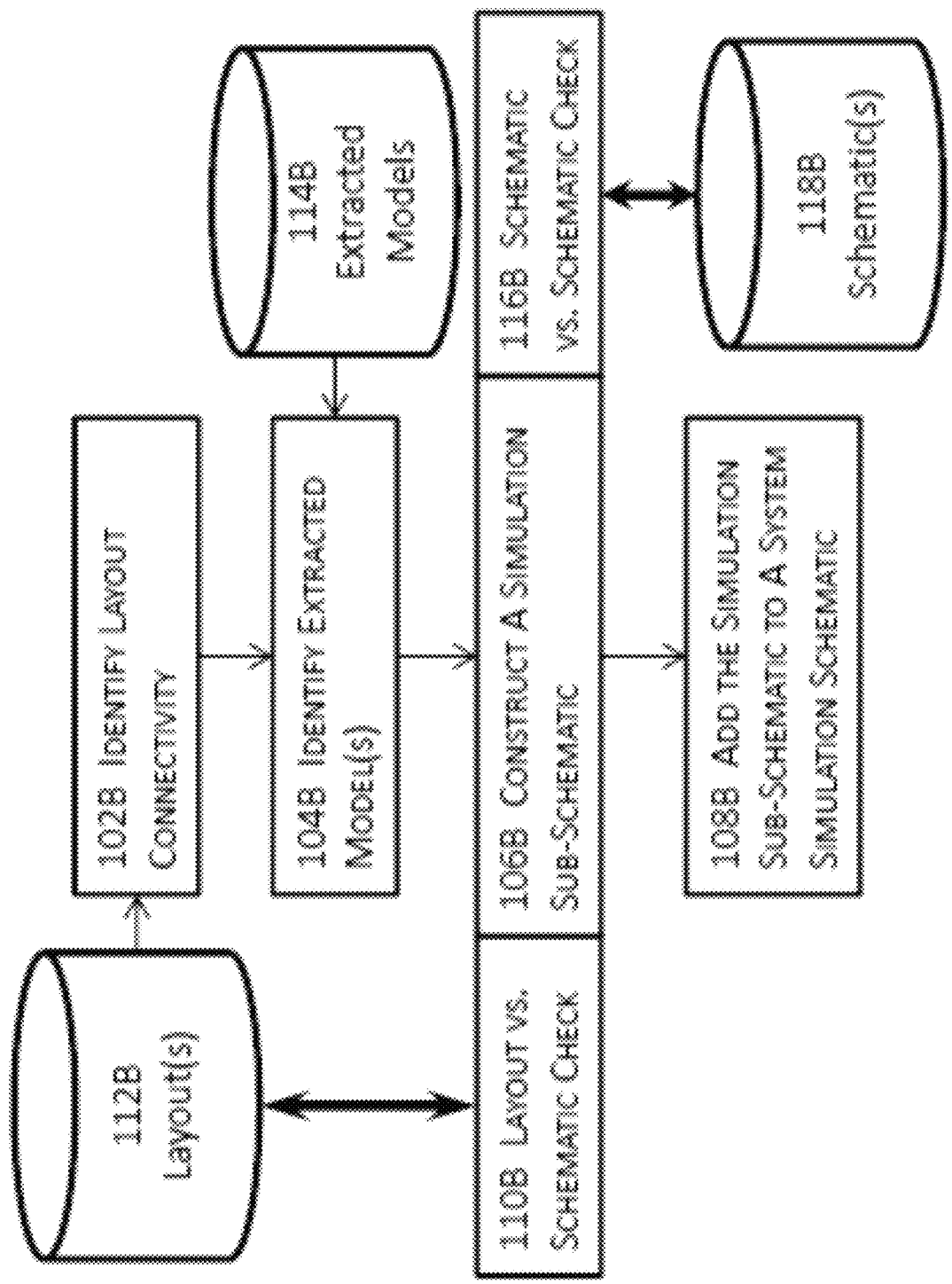
FIG. 1B illustrates another high level schematic block diagrams for power-grid aware simulation of an IC-Package schematic in one or more embodiments.

FIG. 1B illustrates another high level schematic block diagrams performing a power-grid aware simulation of an IC-Package schematic in one or more embodiments. In these embodiments, one or more layouts 112B may be identified from one or more non-transitory computer readable storage media or devices. These one or more layouts may include one or more integrated circuit (IC) layouts, one or more IC package layouts for the one or more IC layouts, and/or a printed circuit board (PCB) layout, etc.

Layout connectivity may be identified or extracted at 102B from these one or more layouts 112B, and the extracted layout connectivity may be used to interconnect various models in the simulation schematic. One or more extracted models may be identified at 104B from a list of extracted models 114B obtained from the same electronic design or one or more prior electronic designs.

It shall be noted that various schematics may or may not necessarily exist in these one or more embodiments illustrated in FIG. 1B. Existing schematic symbols or models may be leveraged such that extracted models need not be constructed every time they are needed in a simulation schematic. A schematic cellview symbol or model may be used directly as an extracted model in a simulation schematic in some embodiments or may be annotated, stitched, or associated with parasitic data to form an extracted model in some other embodiments.

In some embodiments where one or more schematic designs (e.g., the schematic of a PCB design, the schematic of an IC package, the schematic of an IC design, etc.) do exist, the schematic models or cellview symbols for circuit component designs in a plurality of design fabrics may thus be extracted from the respective schematic designs and imported as the extracted models into the simulation schematic. In some embodiments, a schematic cellview symbol or model may further be annotated or stitched with parasitic data and stored as an extracted model in a central repository.

These one or more schematic designs may or may not necessarily be in a format that is compatible or recognizable by the native editor of a simulation schematic. Schematic cellview symbols or models from these one or more schematic designs may be imported as extracted models into a simulation schematic via transformation in some embodiments or may be constructed anew and stored in a central repository in some other embodiments.

In some other embodiments where the schematic designs are unavailable or incomplete such that some circuit component designs extracted from one or more layouts (e.g., an IC layout, an IC package layout, a PCB layout, etc.) do not correspond to any existing schematic models or cellview symbols that may be used in simulation schematics, the extracted models for these layout circuit component designs may be constructed anew.

An extracted model includes a simplified model to represent one or more layout circuit component designs in a simulation schematic in some embodiments. In some of these embodiments, an extracted model is placeable in a simulation schematic and includes model connectivity information (e.g., net names, port names, pin names, etc.) that may be used to interconnect the extracted model to one or more other models or external circuitry in the simulation schematic. For example, extracted models may be interconnected by straight or rectilinear flight-lines in some embodiments.

An extracted model may be constructed anew for a layout circuit component (e.g., an instance of a cell or block) and include a flat or a hierarchical structure of multiple hierarchies or a plurality of circuit components. For example, it may be determined that a circuit component design extracted from a layout does not correspond to any existing extracted models.

In some embodiments, an extracted model may be constructed by using a corresponding schematic cellview symbol or model from the schematic design (if available) or from a schematic cellview symbol data structure. For example, various techniques may first examine a schematic symbol cellview data structure (e.g., a list, a table, a database, etc.) to determine whether a schematic cellview symbol exists for the circuit component design. If an existing schematic cellview symbol exists for the circuit component design based on, for example, the type, identification, function, and/or connectivity, etc. of the circuit component design, the schematic cellview symbol may be retrieved from the schematic cellview symbol data structure to represent the layout circuit component.

The schematic cellview symbol may be further associated with other data (e.g., the identifications of ports for interconnection, the identifications of the layer, the instance, the hierarchy, etc.) specific to this particular circuit component to represent this particular circuit component in simulation schematics. In some other embodiments where no schematic cellview symbols or models correspond to the circuit component design extracted from the layout, a new schematic cell view symbol may be constructed anew with a native schematic editor that is capable of natively editing the simulation schematics in one or more design fabrics.

In some of these embodiments, an extracted model may include a geometric entity (e.g., a rectangle) that has any shape or size and is placeable in a simulation schematic or in the schematic design corresponding to the layout from which the circuit design component is extracted. In some other embodiments, an extracted model may include a geometric entity (e.g., a rectangle) that exactly, approximately, or proportionally represents the actual geometries of the circuit component (or circuit components).

These existing and newly constructed extracted models may thus be used to construct a simulation schematic at 106B for the electronic design that spans across multiple design fabrics. One or more layout versus schematic checks may be performed at 110B on the layouts 112B and the simulation schematic determined at 108B to determine whether the simulation schematic determined at 108B correctly corresponds to the layouts of the electronic design in these multiple design fabrics. In some embodiments where at least some schematic designs 118B are available, one or more schematic versus schematic checks may also be performed at 118B on these at least some schematics and the simulation schematic to determine whether the constructed simulation schematic correctly corresponds to these at least some schematics 118B.

The simulation schematic may be incrementally constructed and added as a simulation sub-schematic to a system simulation schematic at 108B. For example, an IC layout may be identified; circuit design components may be extracted from the identified IC layout; extracted models may be identified or constructed anew for these IC layout circuit design components; the simulation sub-schematic for the IC layout may be constructed with these extracted models; and the simulation sub-schematic may be incrementally constructed into a system simulation schematic (e.g., a system simulation schematic for a PCB design including the IC design).

Figure 1C:
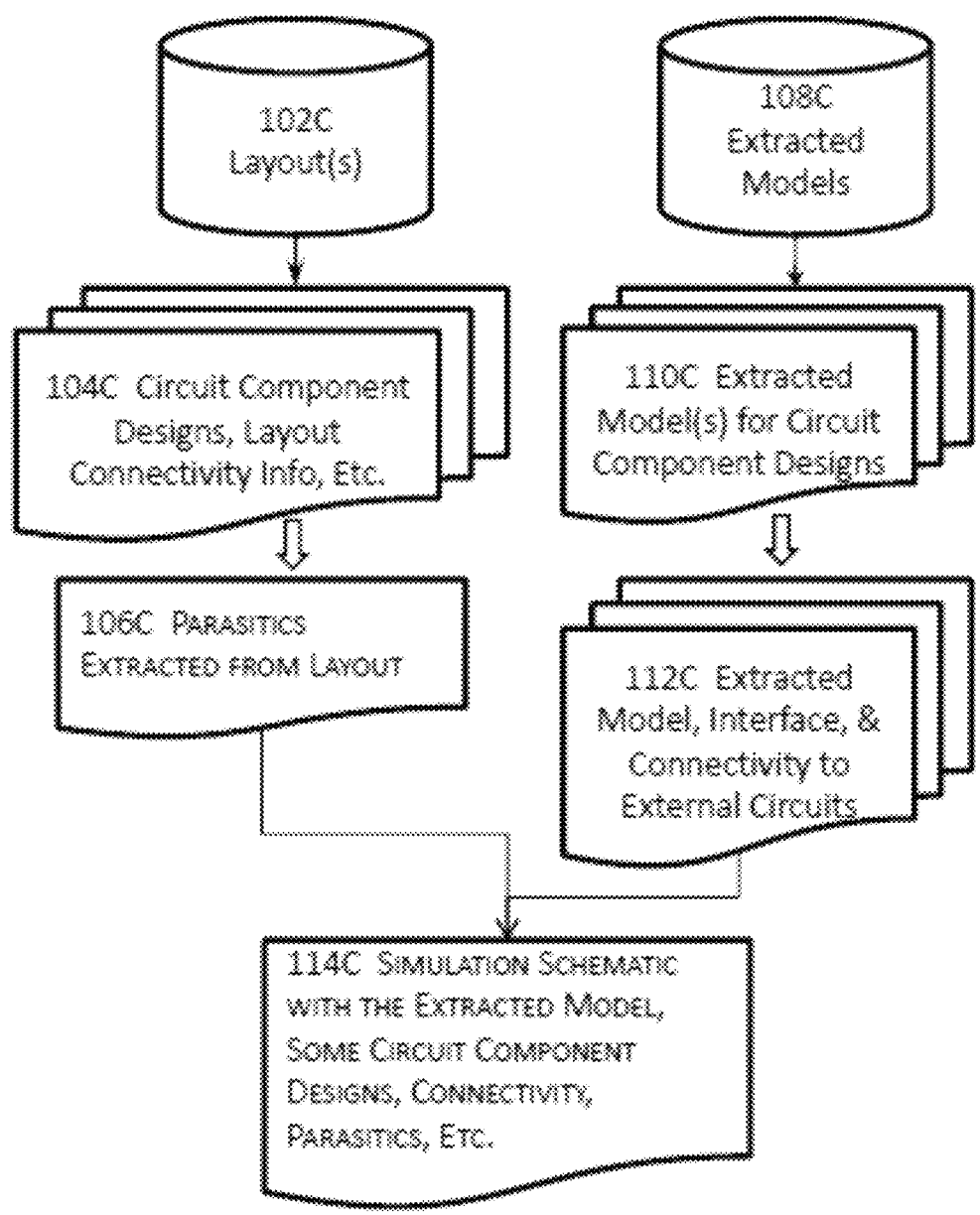
FIG. 1C illustrates another high level schematic block diagrams for power-grid aware simulation of an IC-Package schematic in one or more embodiments.

FIG. 1C illustrates another high level schematic block diagrams for constructing a simulation schematic of an electronic design across multiple design fabrics in one or more embodiments. In these embodiments, one or more layouts (e.g., one or more IC layouts, one or more IC package layouts corresponding to the one or more IC layouts, a PCB layout, etc.) may be identified from a non-transitory computer accessible store medium or device 102C; and existing extracted models corresponding to respective layout circuit components may be retrieved from an extracted model data structure 108C in the same or a different non-transitory computer accessible store medium or device. Circuit component designs and layout connectivity information for interconnecting among these circuit component designs and external circuitry 104C may be extracted from the one or more layouts 102C. Parasitic data 106C may also be extracted from these one or more layouts 102C.

If extracted models 108C exist for at least some circuit component designs in the one or more layout 102C, these extracted models 110C may be retrieved from the extracted model data structure 108C. These existing extracted models, their respective interface information (e.g., the names of the ports, the names of nets connected to the interface, etc.), and/or connectivity information to external circuitry of an extracted model 112C may be identified. In some embodiments, these extracted models themselves may already include or be associated with parasitics and connectivity information.

These existing extracted models for some layout circuit component designs together with newly constructed extracted models for other layout circuit component designs for which no extracted models exist may be placed into a simulation schematic 114C. For example, a layout may include circuit component designs L1, C1, R2, Q4, U1, U2, and L7, where existing extracted models are determined to be available for layout circuit component designs C1, R2, and L7. In this example, the simulation schematic for this layout may include the existing extracted models for C1, R2, and L7 as well as newly constructed extracted models for L1, Q4, U1, and U2.

Figure 1D:
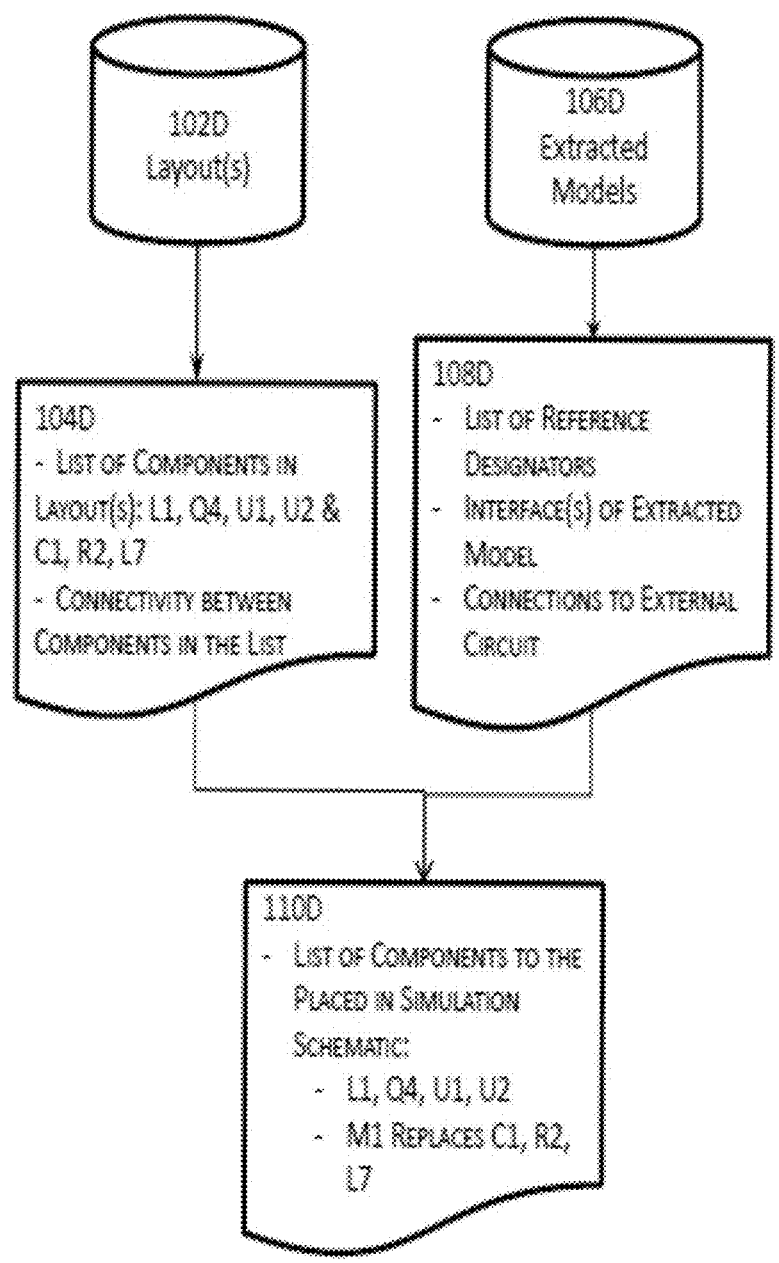
FIG. 1D illustrates an example of determining a list of circuit component designs to place in a simulation schematic in one or more embodiments.

This example is further illustrated in FIG. 1D which illustrates an example of determining a list of circuit component designs to place in a simulation schematic in one or more embodiments. From the layout 102D, a list of circuit component designs 104D in the layout (e.g., L1, Q4, U1, U2, C1, R2, and L7) may be obtained from the layout 102D. In addition, the connectivity between these circuit component designs in the list may also be determined and added to 104D. As described above, an extracted model M1 already exists for the circuit component designs C1, R2, and L7 and may be retrieved from a data structure or database 106D including extracted models. A list of reference designators and the interfaces for the extracted models (e.g., M1) may also be retrieved from the data structure or database 106D. The connectivity information of an extracted model (e.g., M1) may also be retrieved from the data structure or database 106D of extracted models. With the list of components and the connectivity from 104D and the list of reference designators and the interface and connectivity for the extracted model (M1), a list of components or models to be placed in the corresponding simulation schematic 110D may be determined. In this example, the simulation schematic 110D may include the circuit component designs or the schematic symbols or models thereof for L1, Q4, U1, and U2 that do not correspond to any extracted models. The simulation schematic may further include the extracted model M1 that is to replace the circuit component designs (or the schematic symbols or models thereof) for circuit component designs C1, R2, and L7. In some embodiments, an extract model (e.g., M1 in this example illustrated in FIG. 1D) may include, for example, an s-parameter (scattering-parameter) model.

In some embodiments where individual extracted models may not be available or exist, but an aggregated extracted model may nevertheless exist for a plurality of interconnected circuit component designs. In these embodiments, the aggregated extracted model may be identified and used to represent the plurality of interconnected circuit component designs in simulation schematics. In the aforementioned example where no extracted models exist for layout circuit components L1, Q4, U1, and U2, but an aggregated extracted model nevertheless exists and includes these layout circuit components L1, Q4, U1, and U2.

In this example, the aggregated extracted model together with the data of its interface to external circuits, rather than individual extracted models for L1, Q4, U1, and U2, may be used in a simulation schematic in some embodiments. In some embodiments, all the circuit component designs may be first added to a placement list. For a circuit component that corresponds to an existing extracted model, the existing extracted model may be placed in the simulation schematic. For another circuit component design for which no existing extracted models exist, a new extracted model may be constructed and placed into the simulation schematic.

It shall be noted that various techniques described herein do not require schematic designs to perform their intended functions to achieve their intended purposes although elements (e.g., schematic model or cellview symbols, connectivity, etc.) of schematic designs, regardless of whether these schematic designs are complete or partial, may nevertheless be used to reduce the computational resources and/or time needed to constructed a simulation schematic for an electronic design across multiple design fabrics in some embodiments.

A schematic model may include a schematic symbol and connectivity information for interconnecting the schematic symbol to external circuitry. The identified schematic models may be stored in a data structure such as a list, a table, a database, etc. For the ease of explanation or description, the data structure includes and will be referred to as a placement list although other types of data structures may also be used.

Schematic models, like schematic designs, may have the same format or different formats. For example, a PCB schematic design or a PCB schematic model therein may have a different format than an IC schematic design or an IC schematic model therein. In some embodiments, schematic models in different formats may be transformed into a format that is recognized by a native schematic editing tool in one of the multiple design fabrics. For example, PCB schematic models in a first format and IC package schematic models in a second format may be transformed into another format recognizable by an IC schematic editor. In some other embodiments, a new schematic model may be constructed for a schematic model in a different format.

In some embodiments, extracted models may be retrieved from existing sources or constructed anew for layout circuit designs in the layout. An extracted model includes a simplified model having a geometric entity to represent one or more layout circuit component designs in a simulation schematic in some embodiments. In some of these embodiments, an extracted model is placeable in a simulation schematic and includes model connectivity information (e.g., net names, port names, pin names, etc.) that may be used to interconnect the extracted model to one or more other models or external circuitry in the simulation schematic. These extracted models may also be stored in a data structure such as the aforementioned placement list.

In some embodiments, a simulation schematic may be constructed by placing the extracted models into the simulation schematic and further by interconnecting the extracted models with connectivity information extracted from the layout. In some embodiments where schematic cellview symbols or models are also identified for one or more layout circuit components that correspond to no extracted models or aggregated models, the schematic cellview symbols or models may also be placed in the simulation schematic. In addition or in the alternative, parasitic data extracted from the layout may also be stitched into or associated with the corresponding schematic cellview symbols or models or may be placed into the simulation schematic if these schematic cellview symbols or models are also placeable.

In some embodiments, the electronic design includes at least one PCB design having one or more IC package designs interconnected together and encompassing the one or more corresponding IC designs. A schematic model may include an object that includes a schematic symbol, some connectivity information for interconnecting the schematic model to external circuitry, and parasitic information in some embodiments. In some other embodiments, a schematic model may include a schematic cellview symbol or model that is retrieved from a schematic cellview data structure storing therein a plurality of schematic cellview symbols each having one or more parameters awaiting their corresponding one or more values to determine the characteristics or attributes of a specific circuit component that is represented by the schematic cellview symbol or model in a schematic design.

In some embodiments, the schematic cellview symbol or model for a particular layout circuit component may be elaborated by identifying the one or more corresponding parameter values such as names or identifications of the schematic circuit component design represented by the symbol, nets, ports, pins, layer(s), instance(s), etc., interface or interfaces, connectivity information for interconnecting the interface or interfaces to external circuits, or any other information suitable for creating a schematic cellview symbol or model to uniquely represent one or more such schematic circuit component designs in a schematic design.

In some embodiments, layout circuit component designs may be extracted from one or more layouts of the electronic design spanning across multiple design fabrics. In some embodiments, these layout circuit components or information therefor (e.g., identifications of layout circuit component designs with pointers, link structures, or symbolic links to these layout circuit component designs) may be stored in a data structure such as a list, a table, a database, etc. such as a placement list.

One or more layout extracted models corresponding to the one or more identified layout circuit component designs may be retrieved or extracted from a non-transitory computer accessible storage medium or device. In some embodiments where no extracted models are available for certain layout circuit component designs, additional extracted models may be constructed anew for these certain layout circuit component designs. An extracted model includes a simplified model to represent one or more layout circuit component designs in a simulation schematic in some embodiments.

In some of these embodiments, an extracted model is placeable in a simulation schematic and includes model connectivity information (e.g., net names, port names, pin names, etc.) that may be used to interconnect the extracted model to one or more other models or external circuitry in the simulation schematic. In addition or in the alternative, an extracted model may further include parasitic information that is stitched into or associated with the elements (e.g., circuit components, traces, wires, interconnects, etc.), parasitic models encompassing the parasitic information, or a combination thereof.

In some embodiments, existing parasitic models indicative of parasitic information or data of one or more layout circuit components may be identified. A parasitic model may include an s-parameter or SPICE model that represents the R/L/C parasitics of the traces, interconnects, and/or metal structures in an electronic design. In some embodiments where parasitic models are unavailable for certain layout circuit component designs, new parasitic models may be constructed by extracting the corresponding parasitic information or data for these layout circuit component designs from the layout.

In some embodiments, connectivity may include, for example, how various circuit component designs in the PCB layout are connected, the terminal order and/or identifications of an interface of a circuit component design, and/or a mapping to a split symbol instances or nets, etc. in some embodiments. A testbench may be created at by updating the simulation schematic via cross-probing, updating parameter values, and/or modifying the underlying electronic design in some embodiments.

In some embodiments, a layout versus schematic check may be performed on the testbench created at by referencing the PCB layout in some embodiments to cross check the correctness of the testbench, the simulation schematic, and/or the PCB layout. In some embodiments where the PCB schematic is available, a schematic versus schematic check may also be performed on the simulation schematic or the testbench by referencing the PCB schematic to cross check the correctness of the testbench, the simulation schematic, and/or the PCB schematic.

In some embodiments, the testbench may be represented in a hierarchical structure at according to the hierarchical structure of the PCB design in some embodiments or in a flat structure having only one hierarchical level in some other embodiments. Simulations may be performed with the simulation schematic to generate simulation results including, for example, waveforms of signals, etc. In some embodiments where the PCB schematic is available, the PCB schematic may also be associated with the simulation results generated previously.

As used herein, a power distribution network ("PDN") model may refer to a model of a layout made a for Power Distribution Network. An "interface" may refer to one or more connection points through which a circuit interfaces with external connections (usually brought to top level schematic). "I/O" may refer to the input/output buffer of the IC.

In some situations, a user may want to simulate an IC-schematic in the context of a non-ideal power-distribution offered by the power-grid of the Package and IC that eventually feeds to the IC. These simulations guide the user in performing a proper PDN layout of IC and Package (trial layouts) to ensure reliable power delivery. Critical signal nets may get coupled with the PDN, which may cause issues and require further analysis in conjunction with the PDN model. The user may want to route only critical nets and assess performance at early stage. Accordingly, embodiments of the present disclosure provide an approach for inserting package and IC-level PDN models into an IC-Package schematic to allow for one or more simulations of a system schematic including PDN effects.

Figure 2:
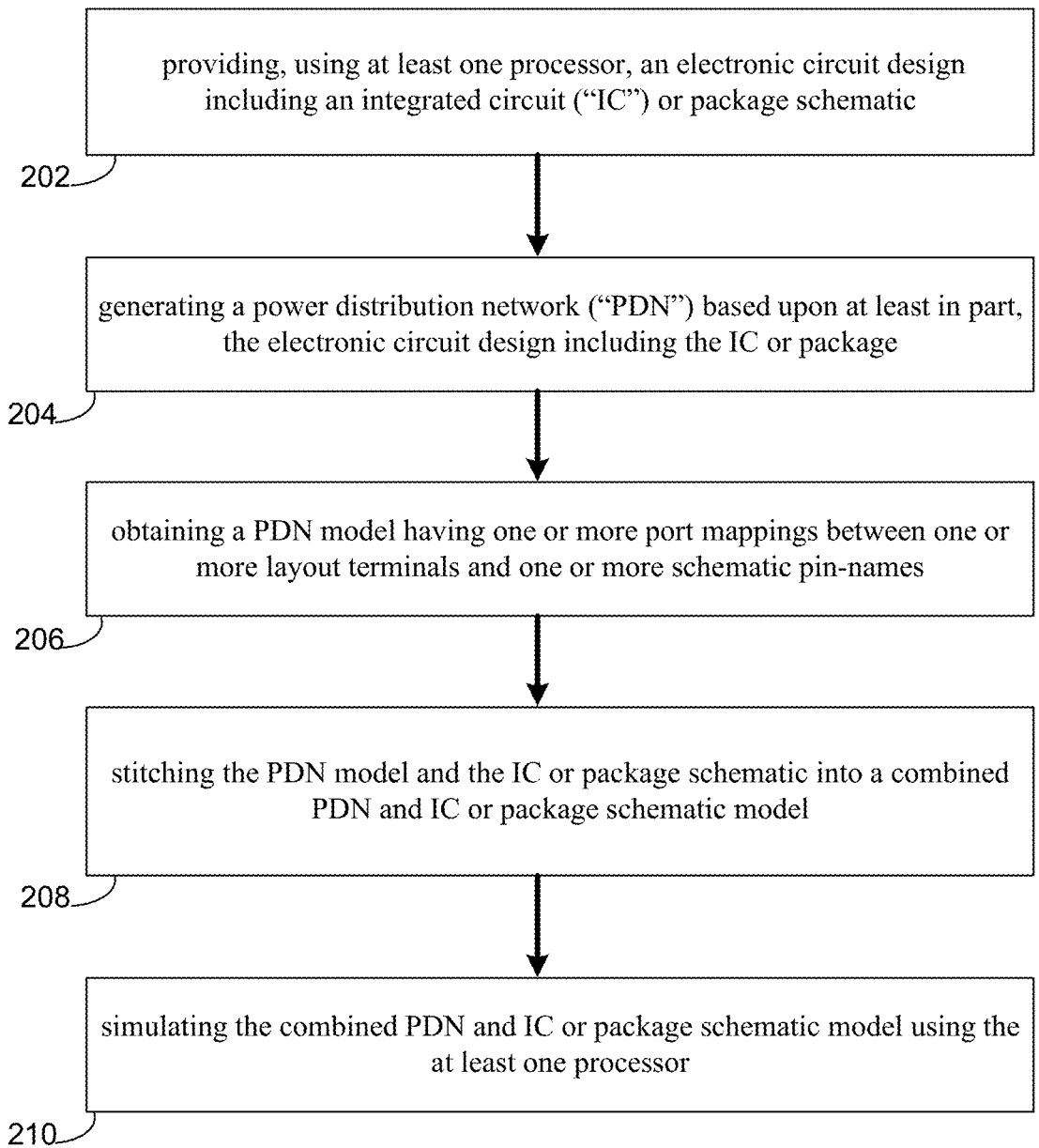
FIG. 2 illustrates a flowchart depicting operations consistent with the power-grid aware simulation of an IC-Package schematic corresponding to one or more embodiments.

FIG. 2 illustrates a high-level flowchart that includes one or more operations that may be employed for a power-grid aware simulation of an IC-Package schematic. The method may include providing (202), using at least one processor, an electronic circuit design including an integrated circuit ("IC") or package schematic and generating (204) a power distribution network ("PDN") based upon at least in part, the electronic circuit design including the IC or package. The method may further include obtaining (206) a PDN model having one or more port mappings between one or more layout terminals and one or more schematic pin-names and stitching (208) the PDN model and the IC or package schematic into a combined PDN and IC or package schematic model. The method may also include simulating (210) the combined PDN and IC or package schematic model using the at least one processor.

Figure 3:
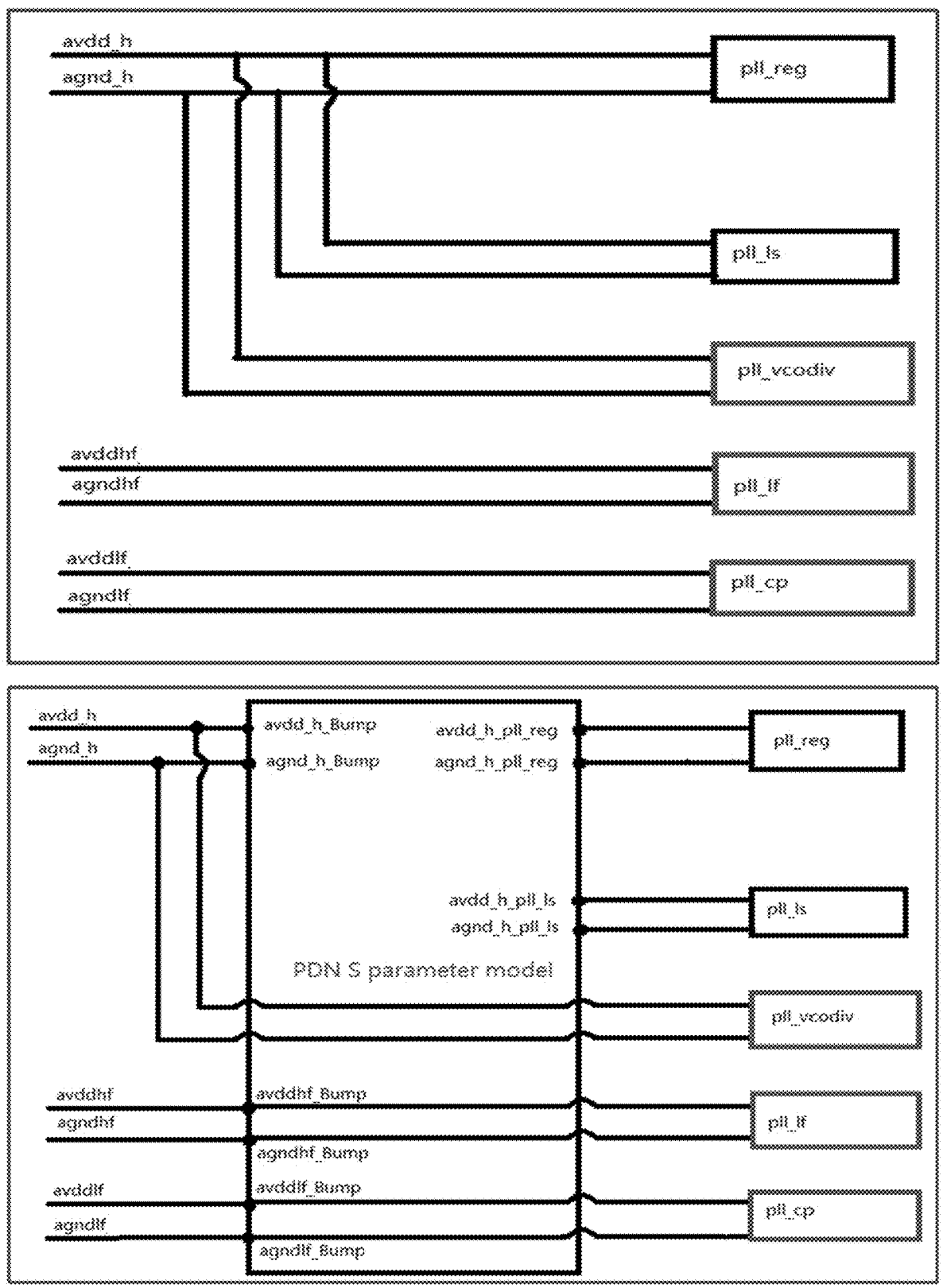
FIG. 3 illustrates a power distribution network corresponding to one or more embodiments.

Referring now to FIG. 3, an embodiment showing an example of a power distribution network is provided. A suitable PDN that feeds power to an IC is critical to the IC's performance. In some situations, a user may want to simulate an IC-schematic in the context of a non-ideal power-distribution offered by Power-grid of Package and IC that eventually feeds to the IC. These simulations help to guide the user to verify an early PDN layout of IC and Package (trial layouts) and guide PDN topology decisions for reliable power-delivery. In some cases, critical signal nets may become coupled with a PDN, thus causing issues and, as such, these may need to be analyzed in conjunction with the PDN model early in the design stage.

Figure 4:
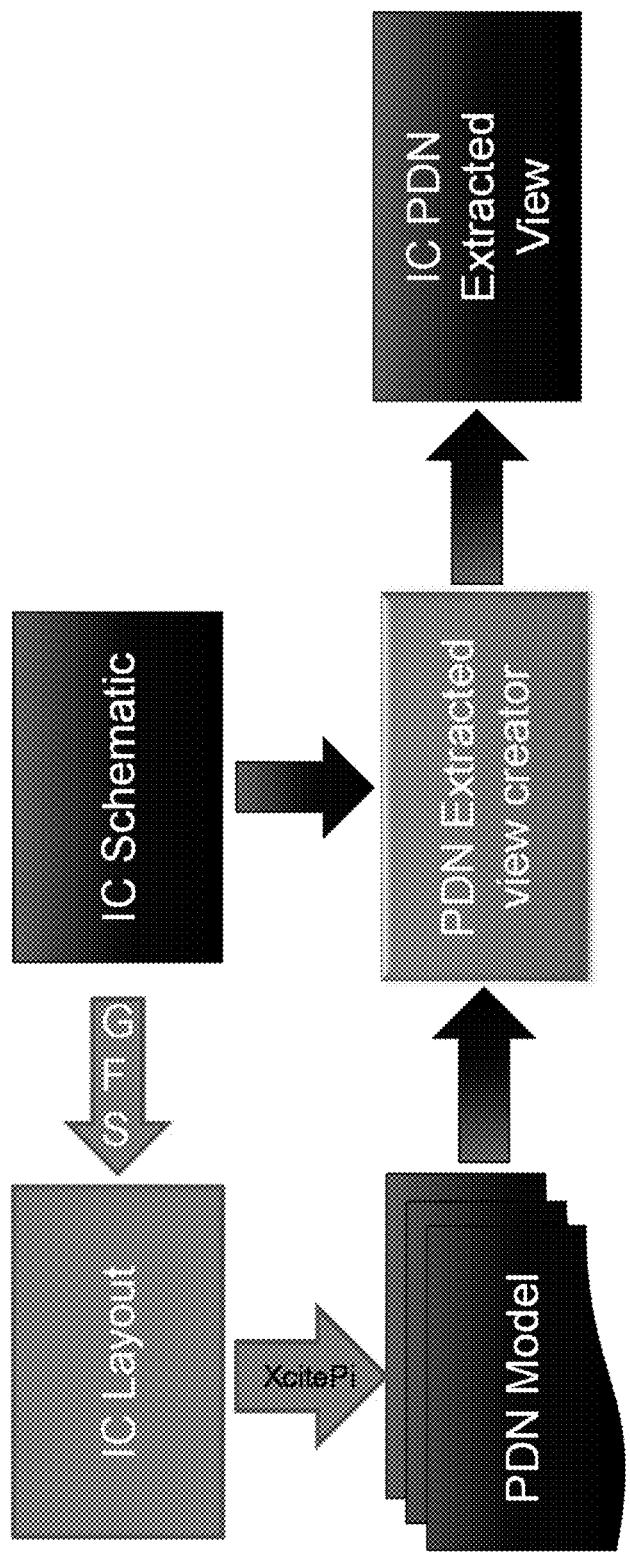
FIG. 4 illustrates a flowchart depicting operations consistent with the power-grid aware simulation of an IC-Package schematic corresponding to one or more embodiments.

Referring now to FIG. 4, a flowchart depicting a power-grid aware simulation of an IC-Package schematic in an electronic design is provided. Embodiments may include the generation of a PDN-aware IC schematic/symbol, the stitching an IC-PDN model, and the creation of a top-level PDN-aware IC schematic/symbol. Embodiments may also include the generation of a Package-PDN schematic. This may include replacing one or more IC instances with "PDN-aware IC instances" maintaining the connectivity of original signals. Embodiments may include replacing the package nets with a Package-PDN model.

In some embodiments, the teachings of the present disclosure may be used to simulate a system schematic with PDN effects. In operation, a PDN layout of an IC and/or package may be generated. A corresponding PDN model may be utilized, which may include a port mapping between layout terminals and schematic pin-names. The process may include breaking some or all of the VDD/GND connections (e.g., for given pin-names in the PDN-model) in the IC schematic. This may be performed using a number of different approaches, including but not limited to a hierarchy traversal approach. This may include rippling up some or all of the hierarchical VDD/GND connections as interfaces to the top-level schematic for every pin-name (corresponding to layout terminal). The process may include creating separate occurrences of hierarchical schematics as though they were logically repeated schematic blocks. The PDN model(s) may then be stitched into the schematic. Interfaces that are physically close may be shorted. For example, these may be user-controlled (e.g., user-defined to start with, followed by automation later) and may depend on how the particular layout was extracted (e.g., if the pins were lumped, etc.).

Figure 5:
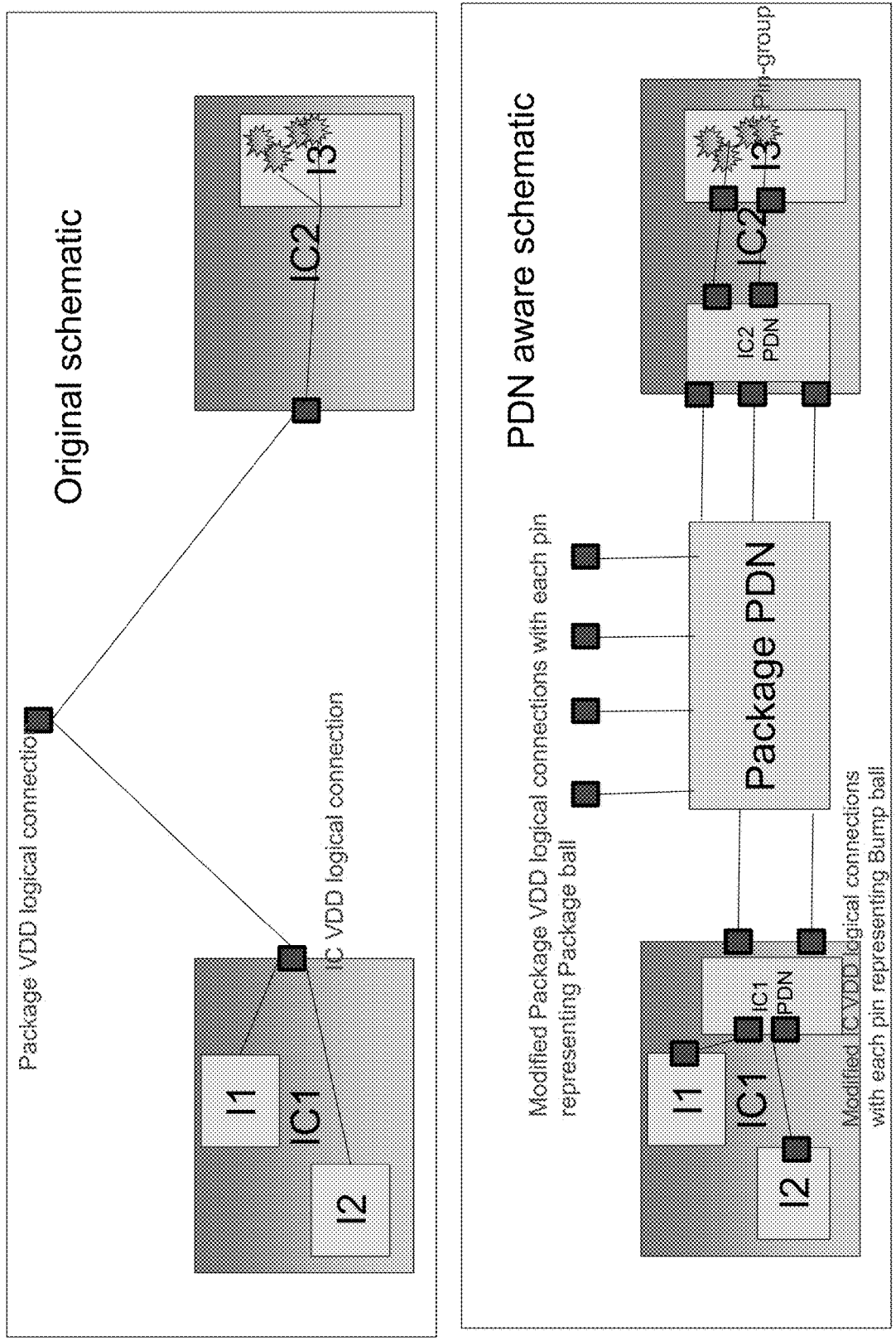
FIG. 5 illustrates a diagram consistent with the power-grid aware simulation of an IC-Package schematic corresponding to one or more embodiments.

Referring now to FIG. 5, an example of how an original schematic may be modified for PDN model connections is provided. In this example, the original schematic is provided in the top portion of the diagram and the PDN aware schematic is shown below. The original schematic displays a package VDD logical connection connected to an IC VCC logical connection of each of IC1 and IC2. In contrast, the PDC aware schematic includes a package PDN having one or more modified package VDD logical connections with each pin representing a package ball. Each IC includes one or more modified IC VDD logical connections with each pin representing a bump ball.

Figure 6:
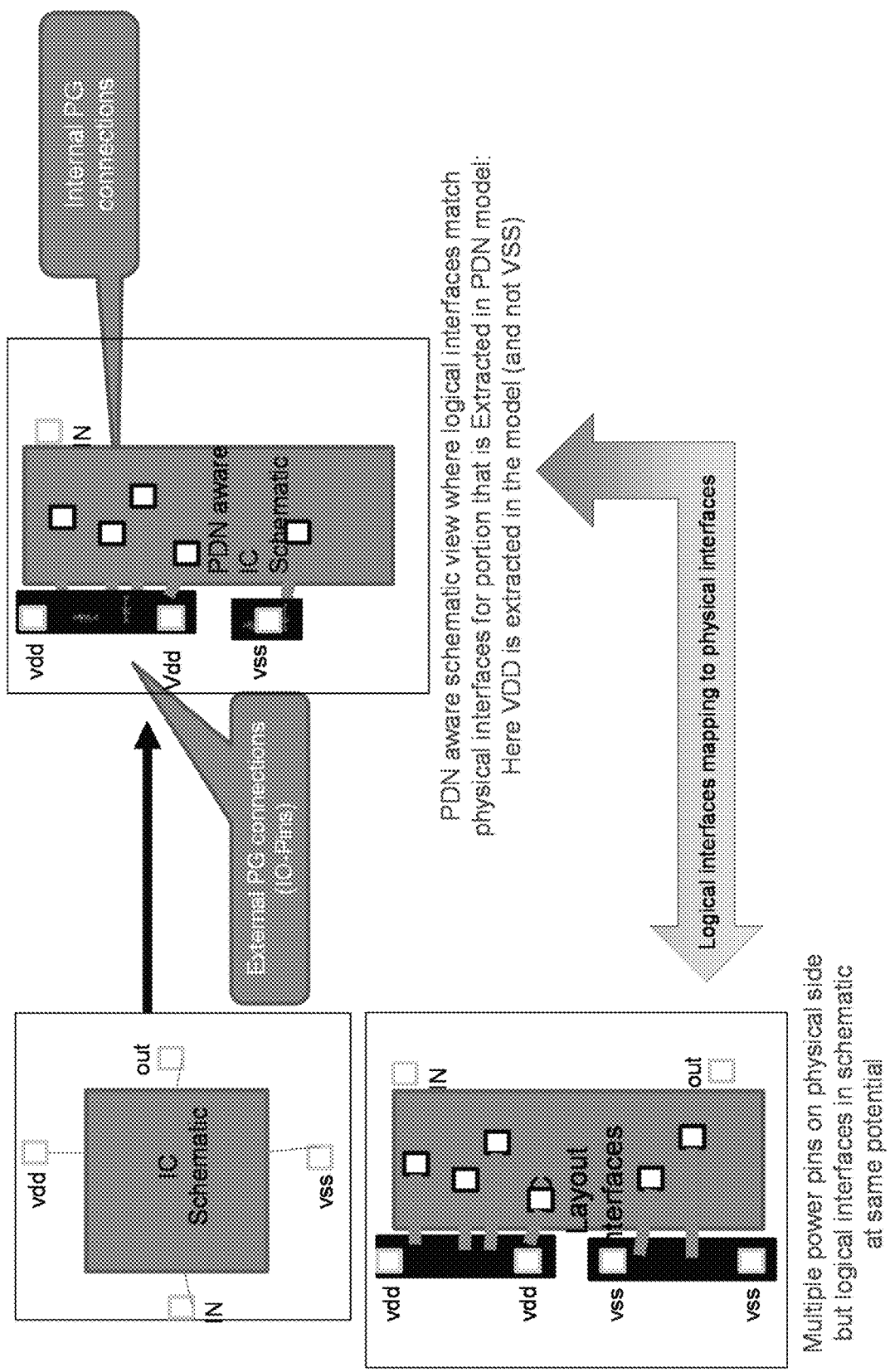
FIG. 6 illustrates a diagram showing the generation of a PDN-aware IC schematic/symbol corresponding to one or more embodiments.

Referring now to FIG. 6, an example of the generation of a PDN-aware IC schematic/symbol is provided. In this example, the PG IO-Pins in the IC layout may be reflected as logical interfaces for PG nets in the schematic. The IC schematic may include the logical PG connectivity where a single pin may be used to drive the PG for entire design. While the layout view can possibly have multiple bumps for each PG connection. Embodiments included herein may provide a solution to automatically create the PDN aware IC schematic view. In some embodiments, a PDN aware schematic view may be displayed where logical interfaces match physical interfaces for a portion that is extracted in a PDN model. In this particular example, VDD may be extracted in the model (and not VSS). Multiple power pins may be displayed on the physical side and logical interfaces may be in the schematic at the same or similar potential.

Referring also to FIG. 7, another example of the generation of a PDN-aware IC schematic/symbol is provided. Here, the generation of a PDN aware symbol view of the IC based on the external PG bump in the layout is provided. In this example, the symbol view of the IC is provided on the left and the generated symbol view for the TOP_pdn cell is provided on the right. In this example, the IC symbol includes one power and ground pin (e.g., VDD and VSS). For each external PG connection, a new pin may be introduced on the symbol view. The name of the pin may be derived from the model header specification. Since the existing pins VDD and VSS are not going to be connected they can be deleted as well.

Figure 8:
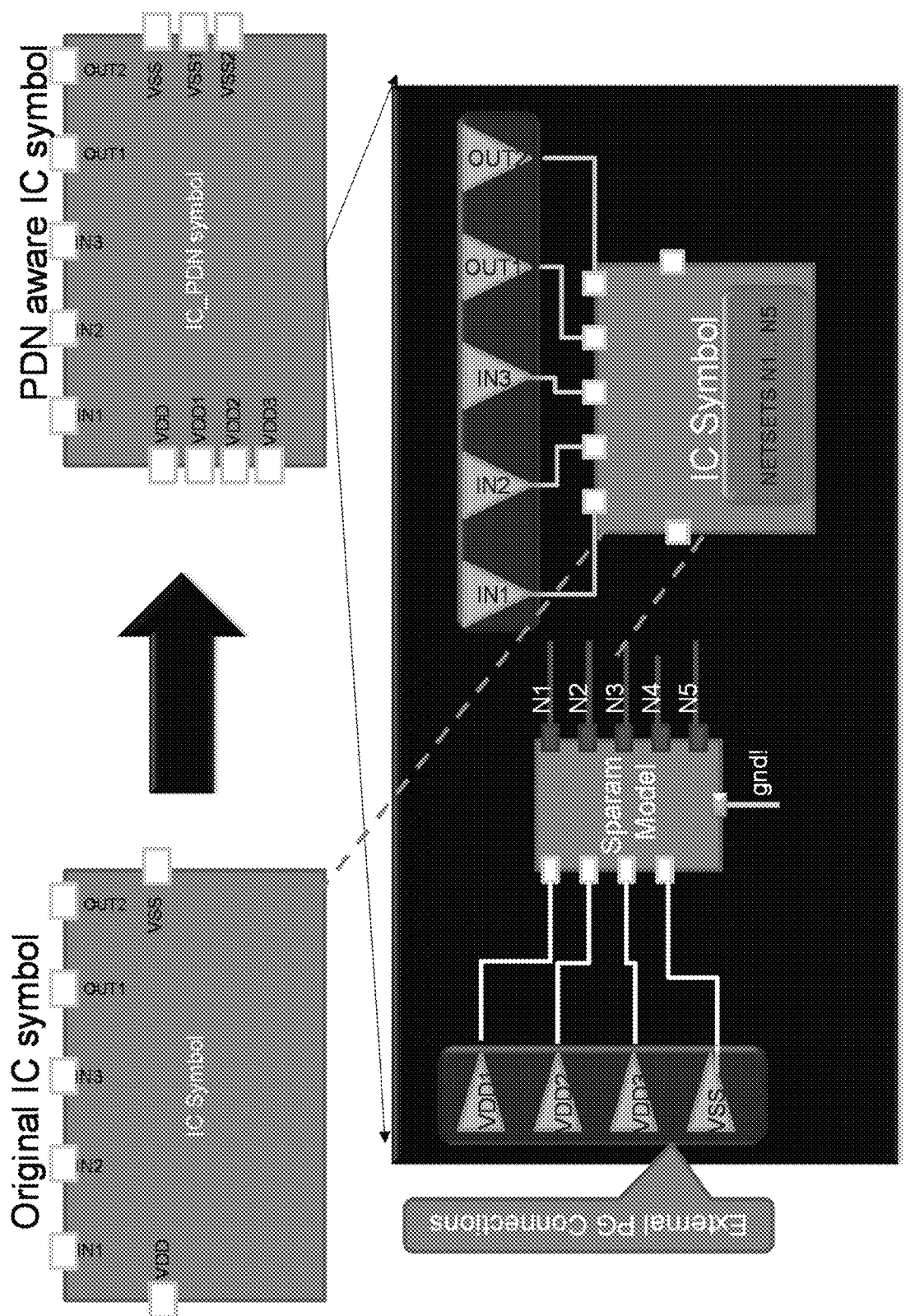
FIG. 8 illustrates a diagram showing the generation of a PDN-aware IC schematic/symbol corresponding to one or more embodiments.
Figure 9:
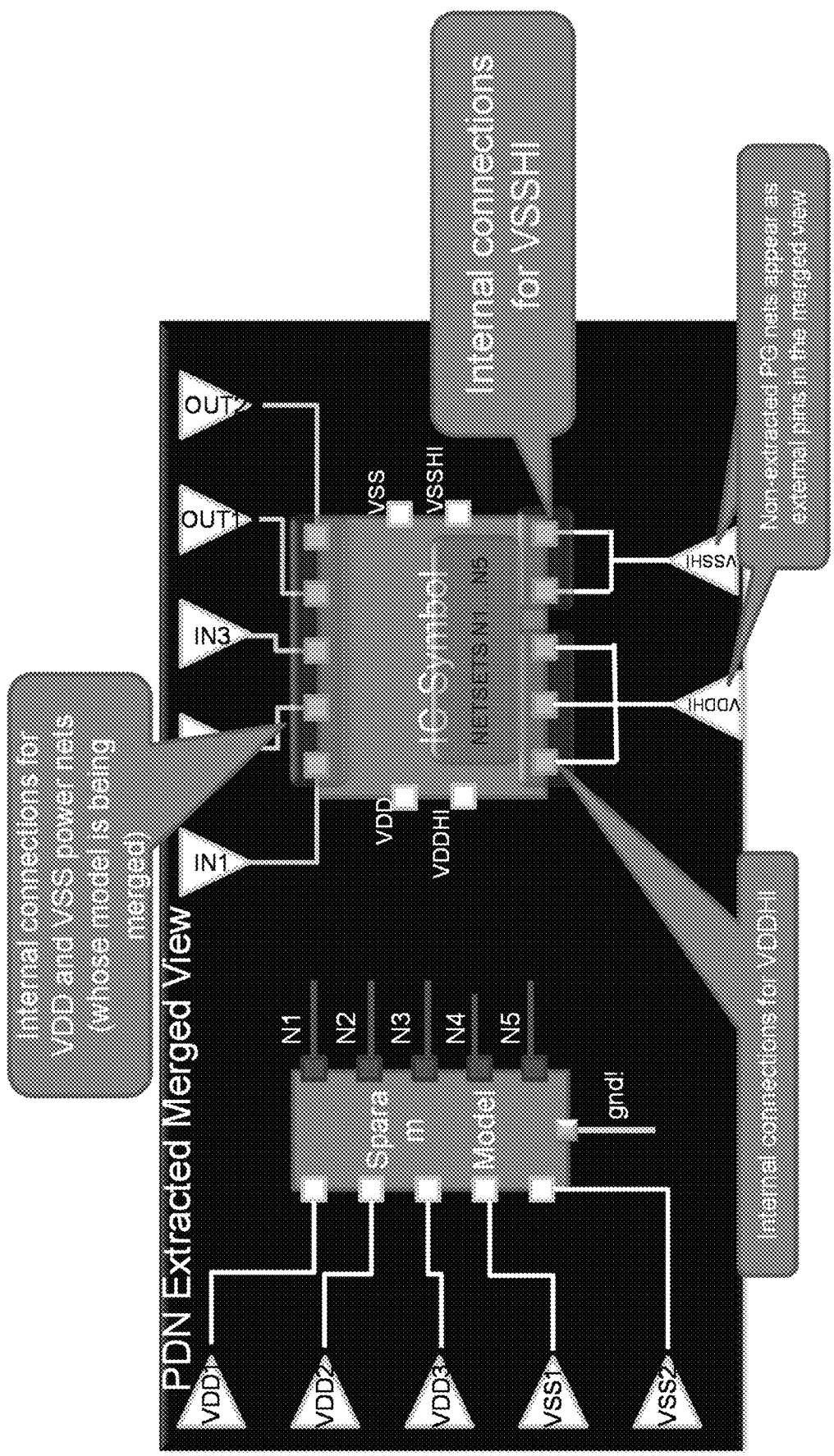
FIG. 9 illustrates a diagram showing the generation of a PDN-aware IC schematic/symbol corresponding to one or more embodiments.
Figure 10:
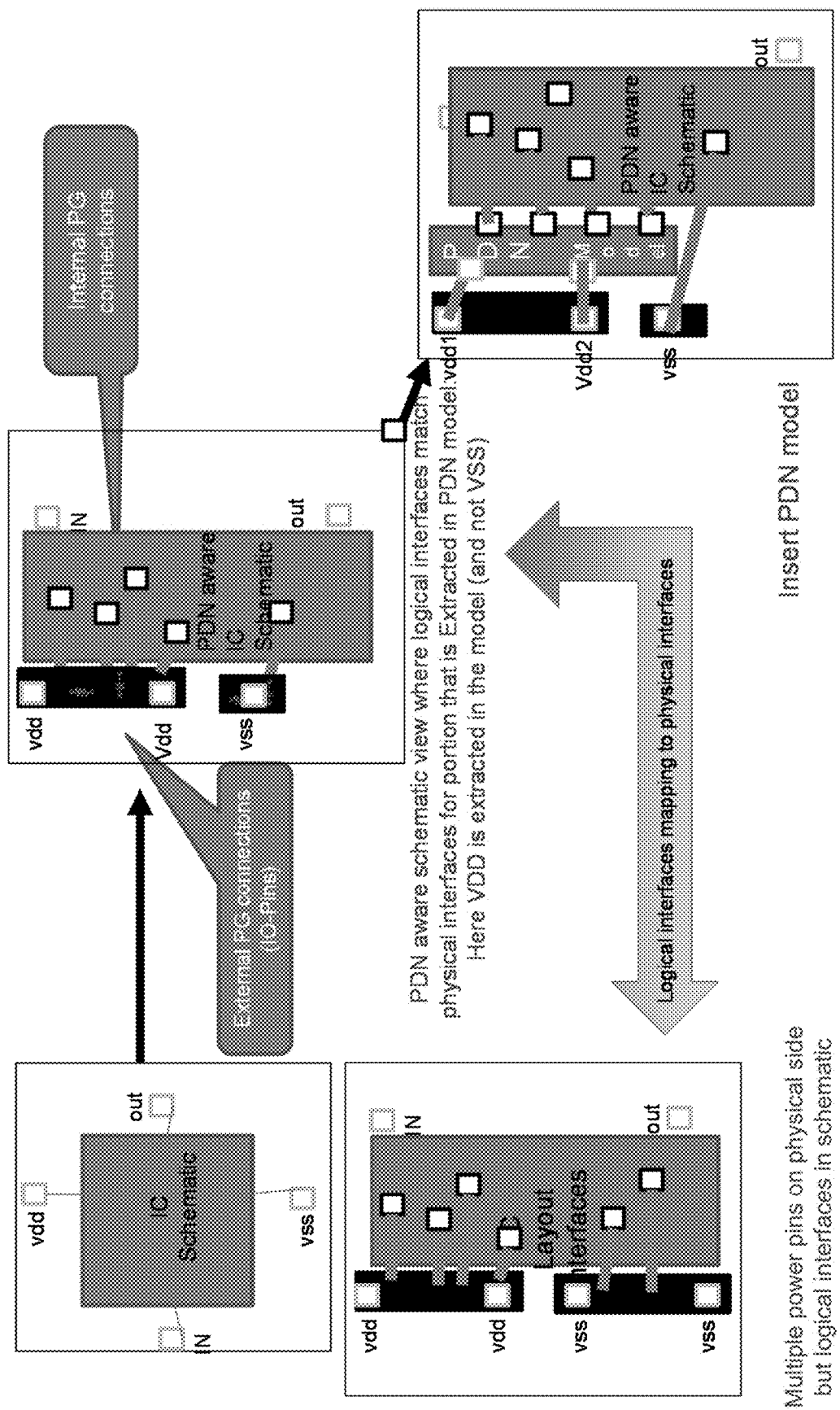
FIG. 10 illustrates a diagram showing the generation of a PDN-aware IC schematic/symbol corresponding to one or more embodiments.

Referring also to FIGS. 8-10, another example of the generation of a PDN-aware IC schematic/symbol is provided. In this example, the insertion of an IC-PDN model is shown. FIG. 8 shows that the IC symbol view may be stitched with the PDN s-parameter model at the top level PDN schematic and hence generate an interface that may be equivalent to the physical layout (external connections). The internal connections of the model may be made to the IC design hierarchy through the inherited connections. FIG. 9 shows an example having partial PG extraction. If the PG extraction is done partially, the ones which are not extracted may be shorted at the top level and presented as a single logical connection. FIG. 10 shows an example PDN aware schematic view where logical interfaces match physical interfaces for a portion that is extracted in a PDN model. Again, VDD may be extracted in the model (and not VSS). FIG. 10 depicts the connectivity of the s-parameter model with the PDN aware IC schematic in accordance with the teachings of the present disclosure.

Figure 11:
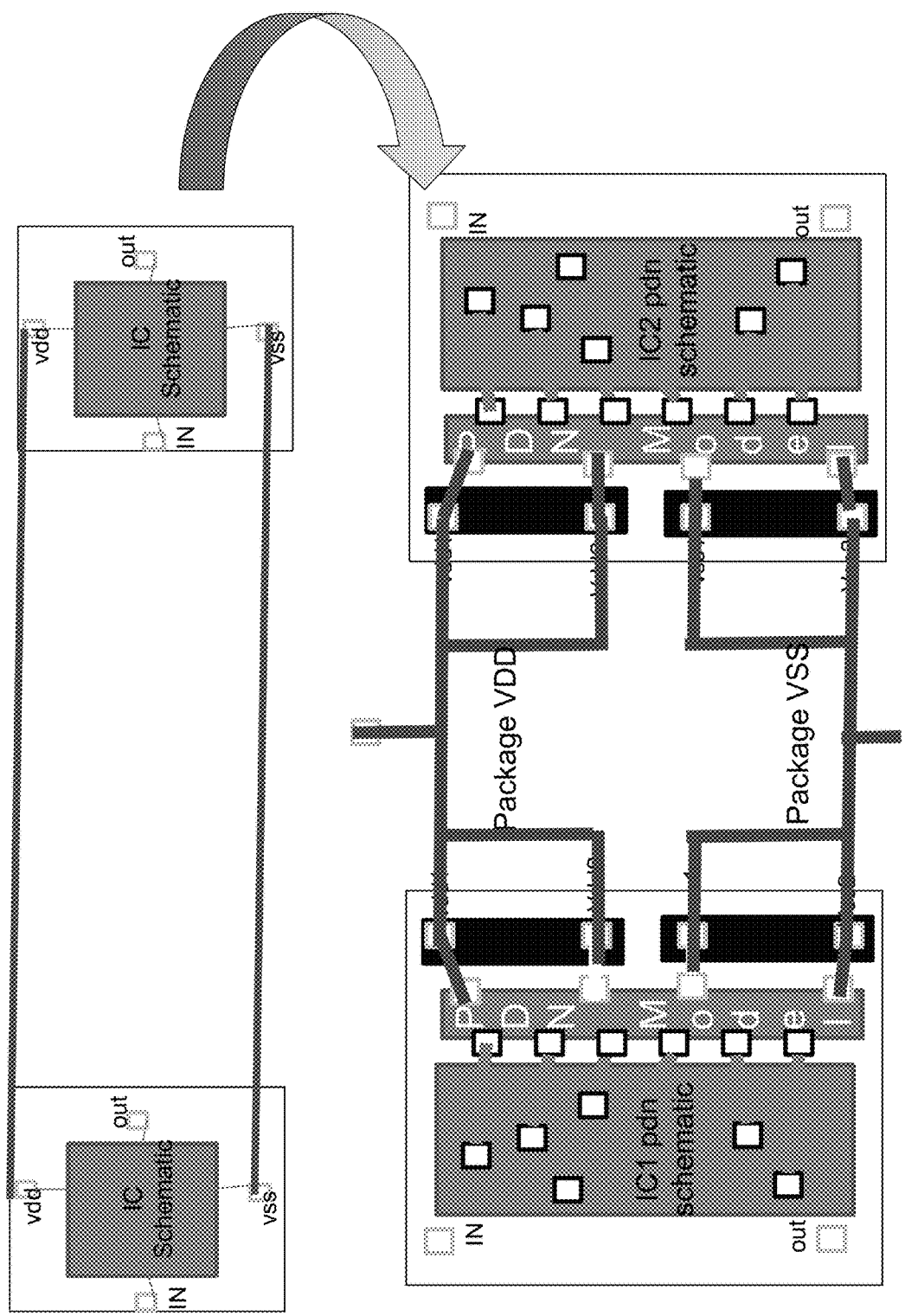
FIG. 11 illustrates a diagram showing the generation of a PDN Package Schematic corresponding to one or more embodiments.
Figure 12:
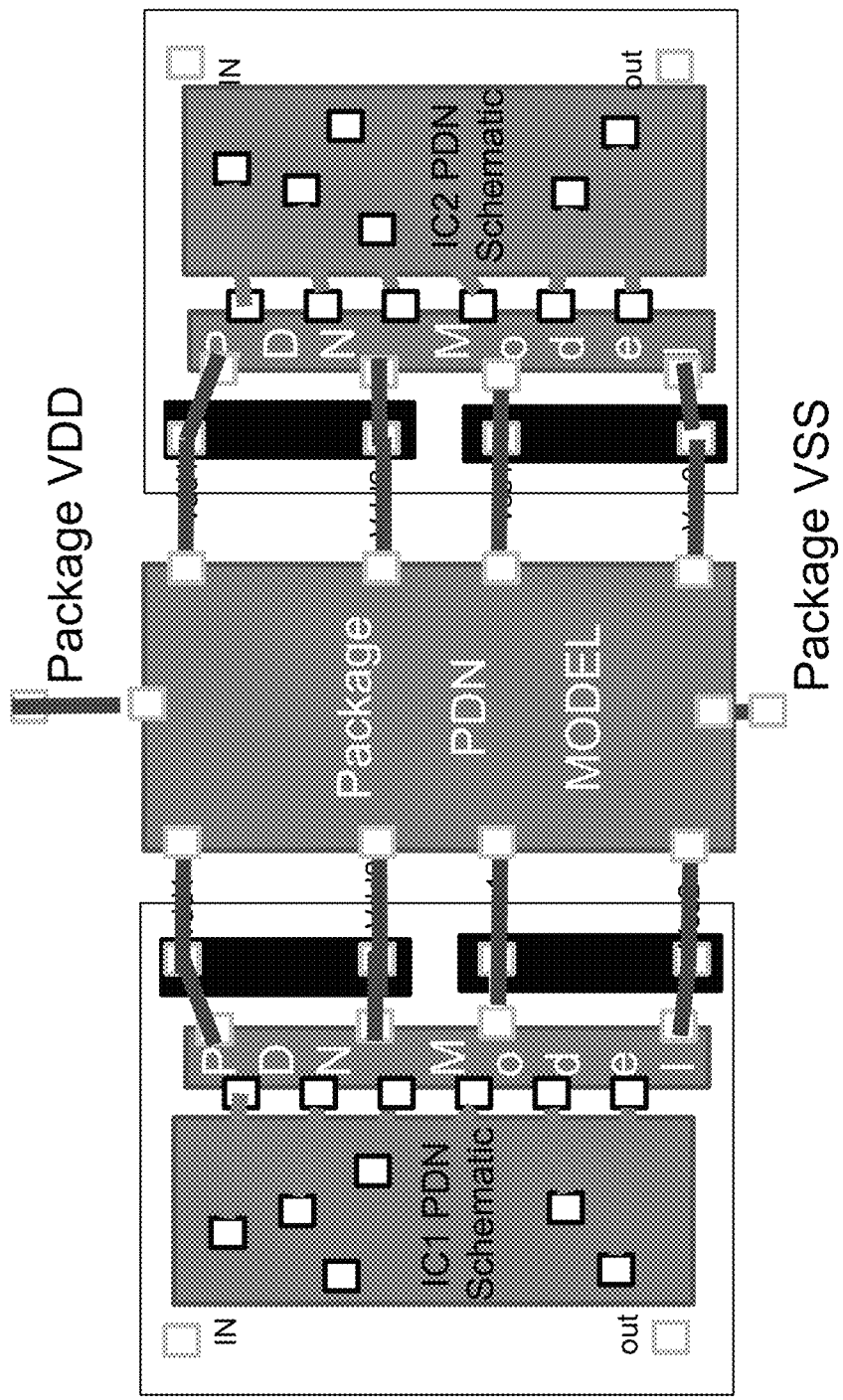
FIG. 12 illustrates a diagram showing the generation of a PDN-aware IC schematic/symbol corresponding to one or more embodiments.

Referring now to FIG. 11, an example showing the generation of a PDN package schematic is provided. In this particular example, IC instances are replaced with PDN aware IC instances. For example, if there are multiple ICs instantiated in a package, then these can be replaced with their PDN aware schematic and thus enabling the user to analyze the effect of PDN extraction. FIG. 12 shows an example depicting the insertion of a package-PDN model. Here, there is no loss of accuracy due to the lumping of VDD/GND pins. This example shows the model stitching if the PDN extraction is performed at the package level.

Figure 13:
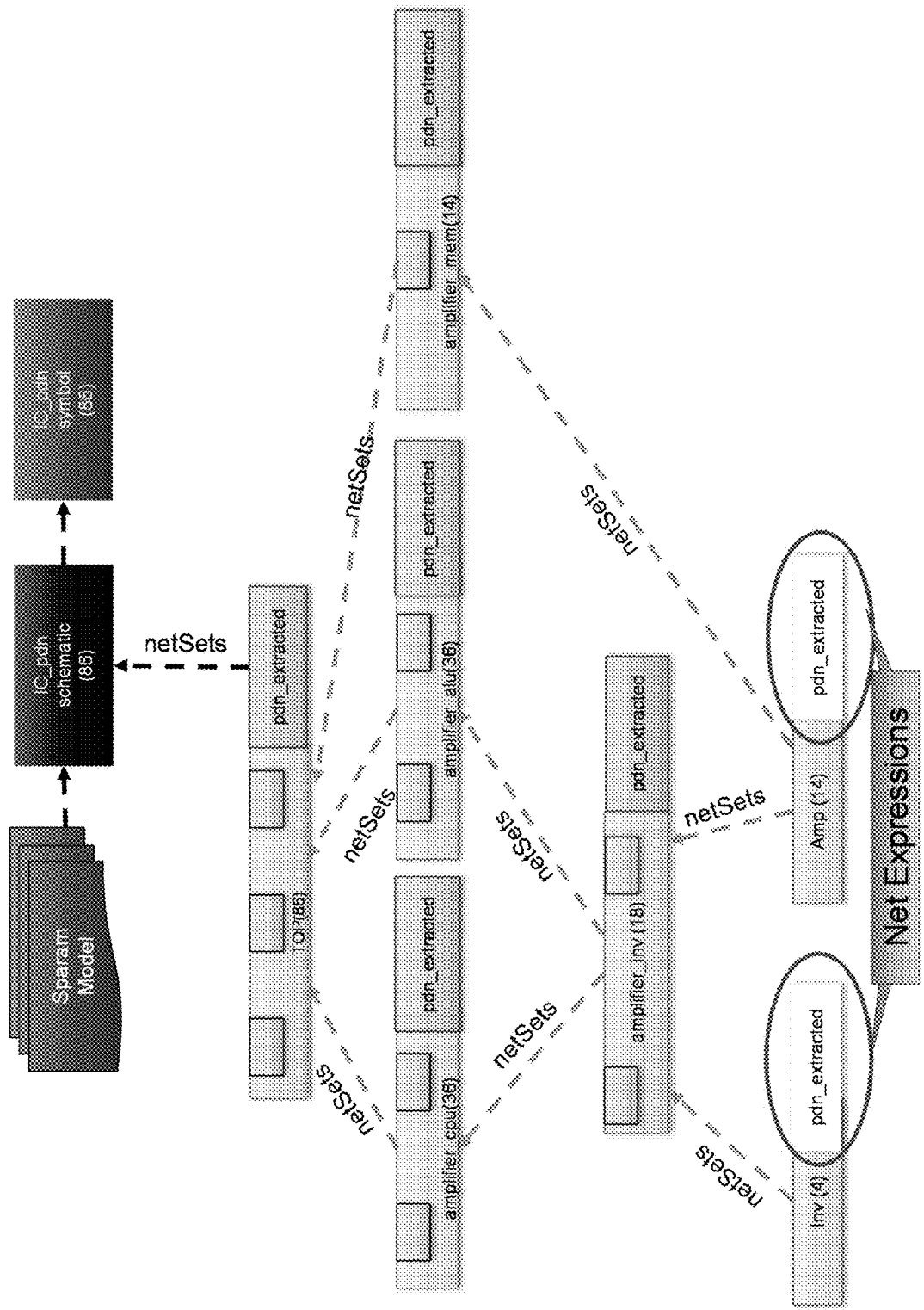
FIG. 13 illustrates a diagram showing the generation of a IC PDN symbol corresponding to one or more embodiments.
Figure 14:
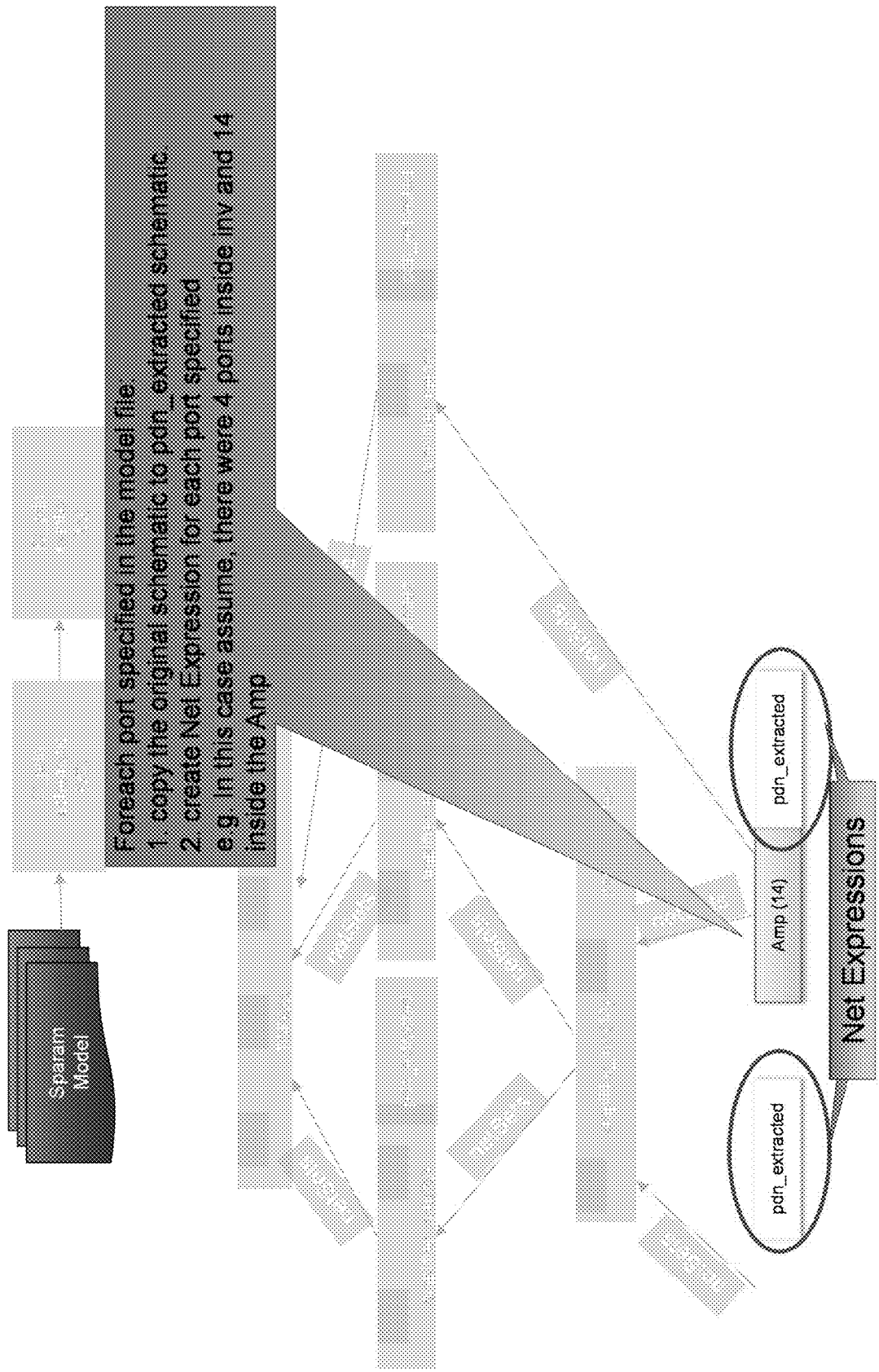
FIG. 14 illustrates a diagram showing the generation of a IC PDN symbol corresponding to one or more embodiments.
Figure 15:
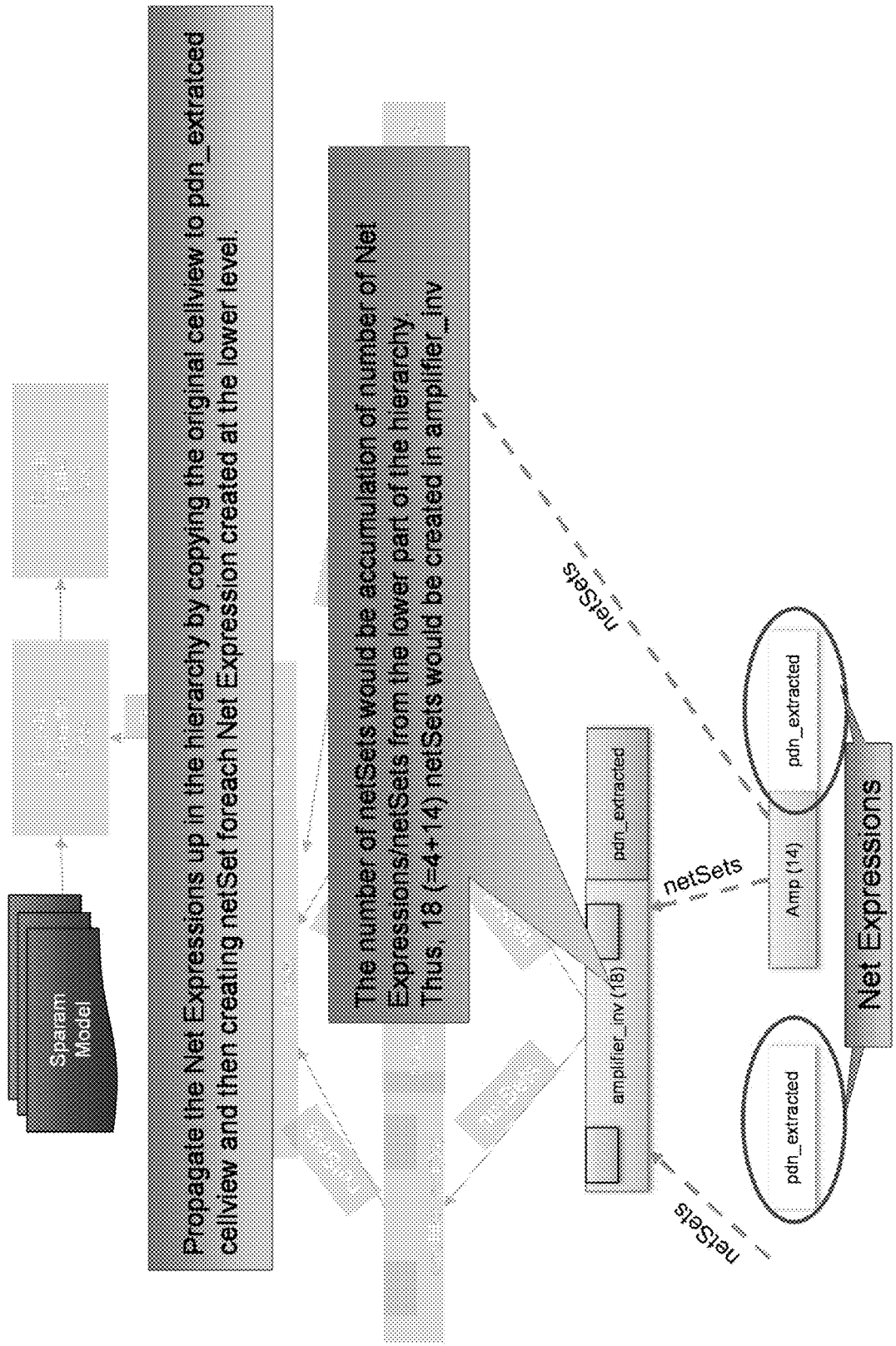
FIG. 15 illustrates a diagram showing the generation of a IC PDN symbol corresponding to one or more embodiments.

Referring also to FIGS. 13-18, an example showing the generation of an IC PDN symbol is provided. In this example, rippling up of the IC PG nets from the lower-level to the top is shown. FIG. 13 depicts a sample design hierarchy (with occurrence). The netExpressions are created on the PG nets connecting at the leaf level of the design hierarchy. Then, how their flow to the hierarchy above using netSets. The numbers in braces indicate the number of inherited connections flowing upward. FIGS. 14-15 show the proposal for the s-parameter model header which enables the user to not only extract at the individual connection level but also at the instance level (if an instance has multiple PG connections).

As shown in FIG. 14, another example showing the rippling up of the IC PG nets from the lower-level to the top is shown. For each port specified in the model file the process may include copying the original schematic to the pdn_extracted schematic and creating the Net Expression for each port specified. For example, in this case assume, there were four ports inside the Amp.

As shown in FIG. 15, the process may include propagating the net expressions up in the hierarchy by copying the original cellview to the pdn_extracted cellview and then creating netSet for each net expression created at the lower level. The number of netSets would be the accumulation of the number of net expressions/netSets from the lower part of the hierarchy. Thus, 18 (=4+14) netSets would be created in amplifier_inv.

Figure 16:
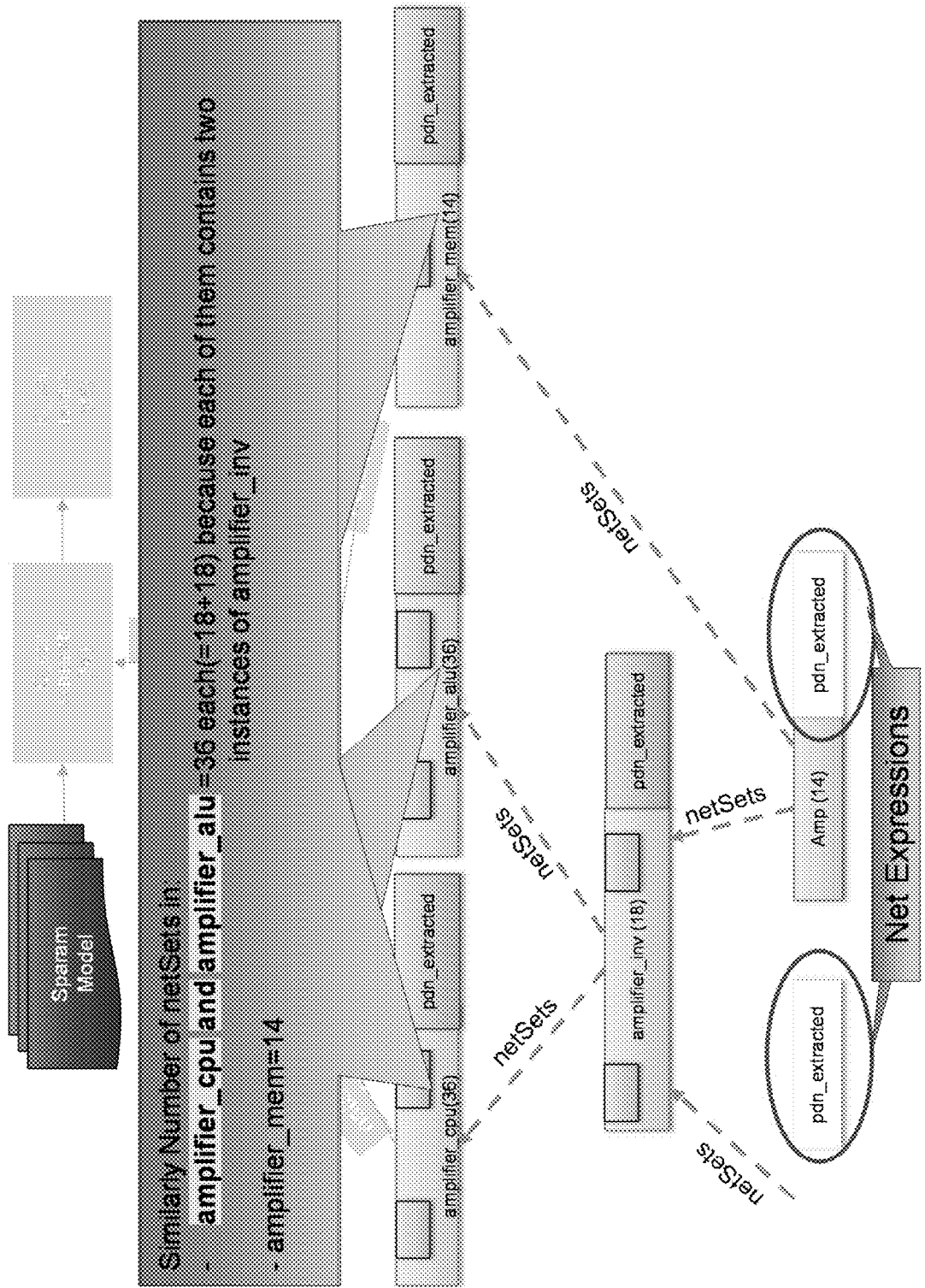
FIG. 16 illustrates a diagram showing the generation of a IC PDN symbol corresponding to one or more embodiments.
Figure 17:
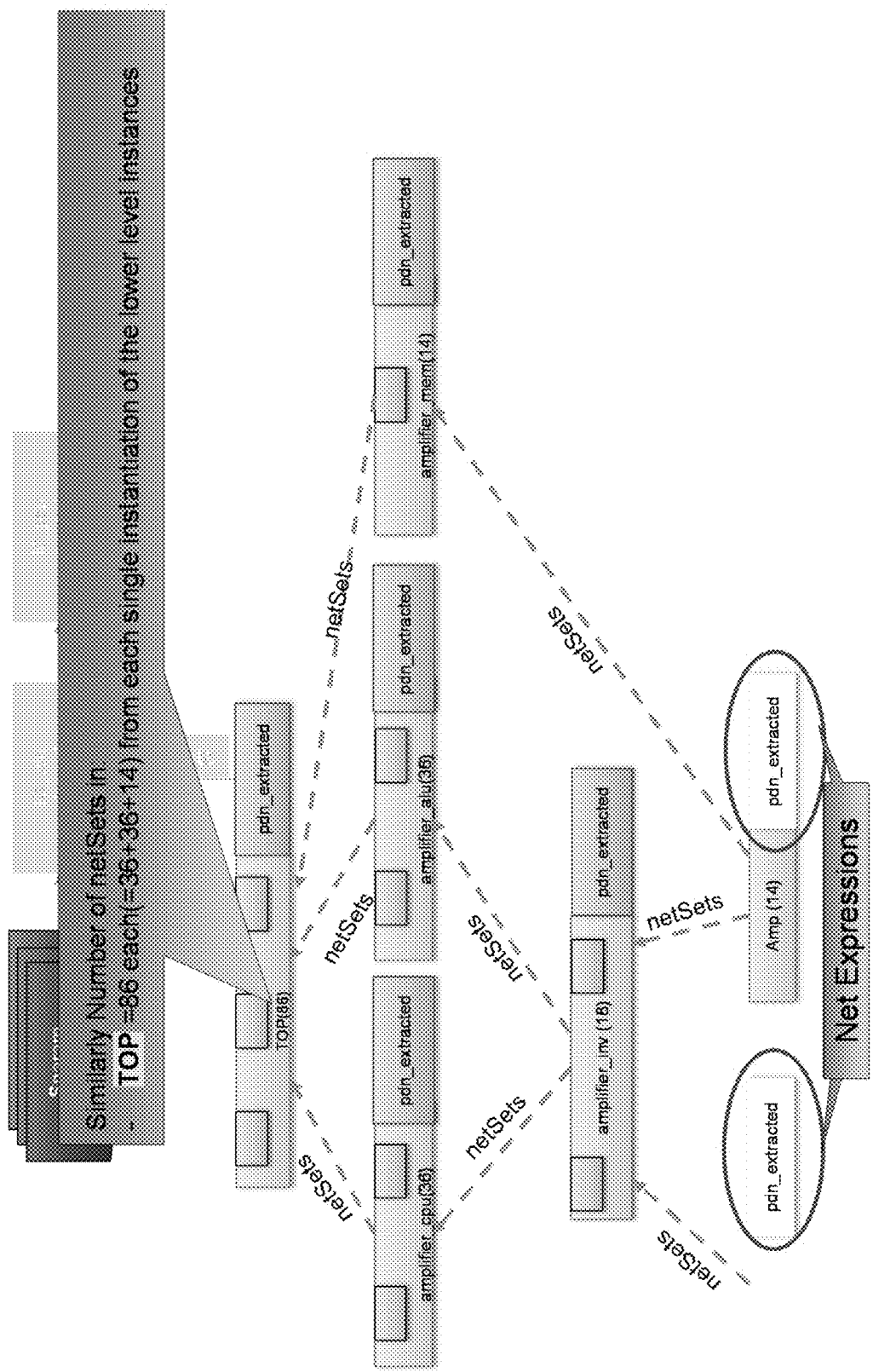
FIG. 17 illustrates a diagram showing the generation of a IC PDN symbol corresponding to one or more embodiments.

Referring now to FIG. 16, an example showing the generation of the IC PDN symbol is provided. Here, the number of netSets in amplifier_cpu and amplifier_alu=36 each (18+18) because each contains two instances of amplifier_inv. Similarly, amplifier_mem=14. As shown in FIG. 17, the number of netSets in TOP=86 each (36+36+14) from each single instantiation of the lower level instances.

Figure 18:
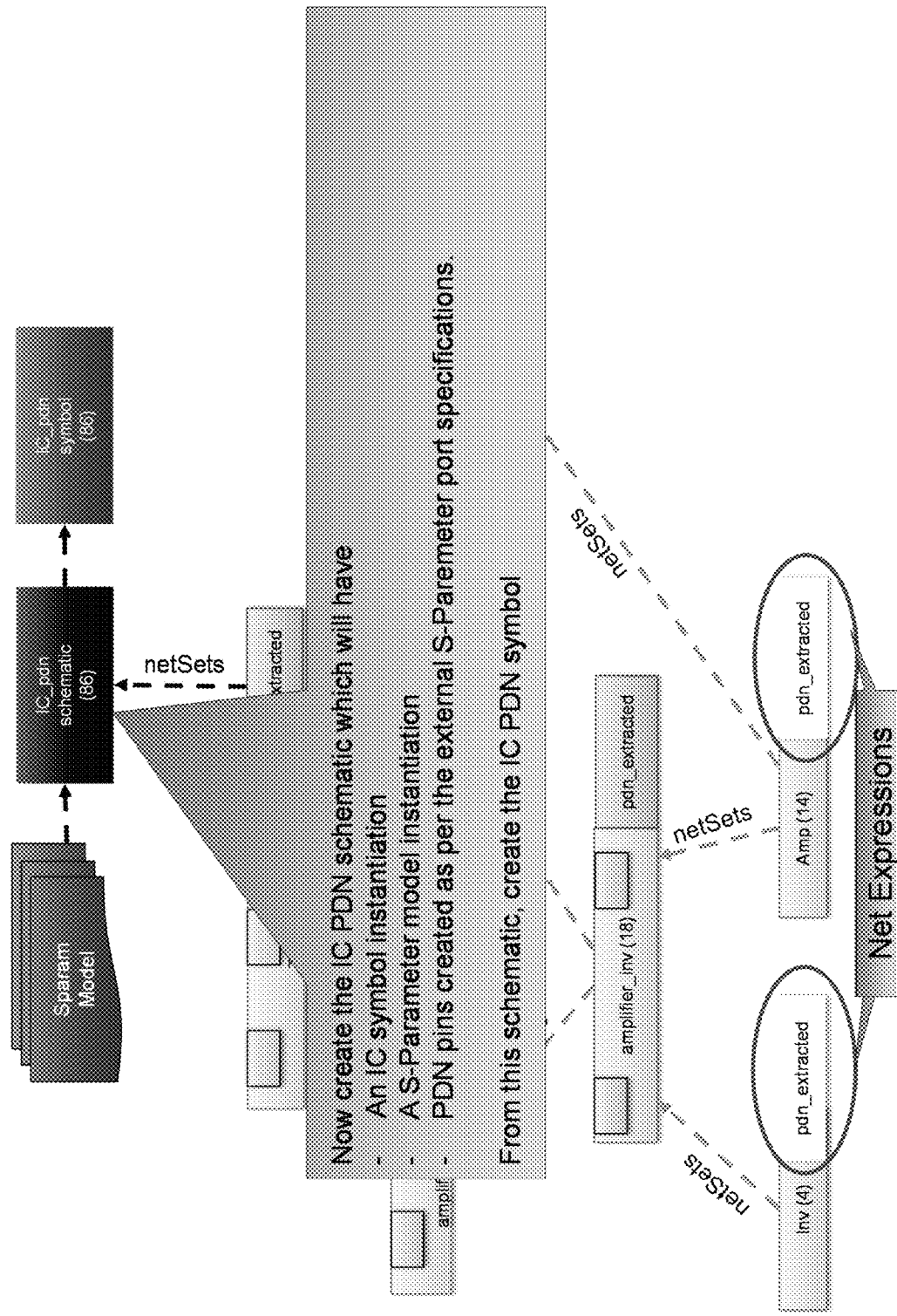
FIG. 18 illustrates a diagram showing the generation of a IC PDN symbol corresponding to one or more embodiments.

Referring now to FIG. 18, the process may then create the IC PDN schematic (as shown on FIG. 9). The schematic may include an IC symbol instantiation, an S-Parameter model instantiation, and/or one or more PDN pins created as per the external S-Parameter port specifications. From this schematic, create the IC PDN symbol (as shown in FIG. 8).

Figure 19:
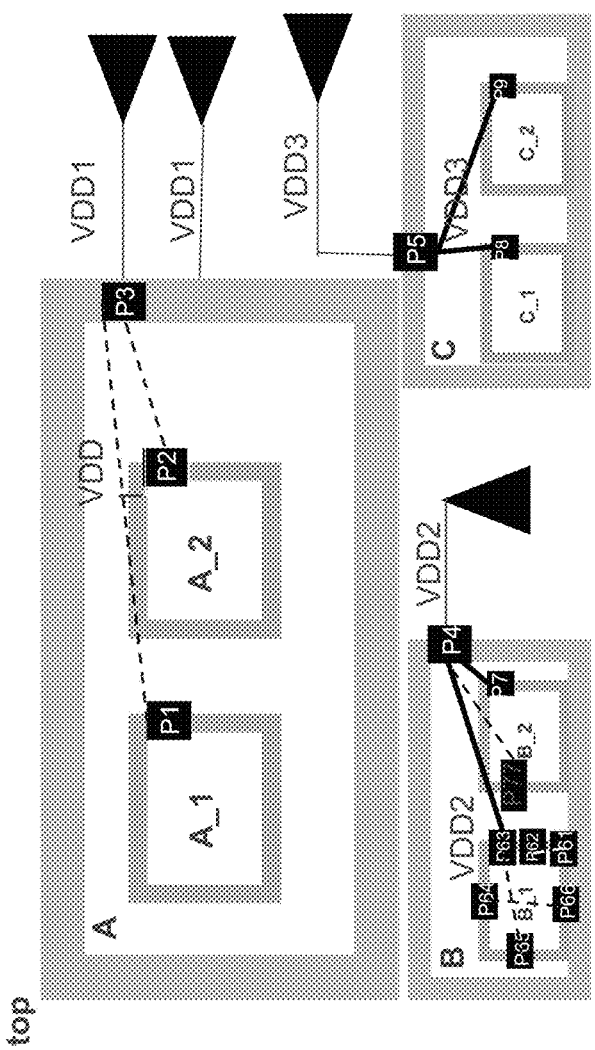
FIG. 19 illustrates a diagram showing the generation of a PDN model header to drive automatic connections to a PDN model corresponding to one or more embodiments.
Figure 20:
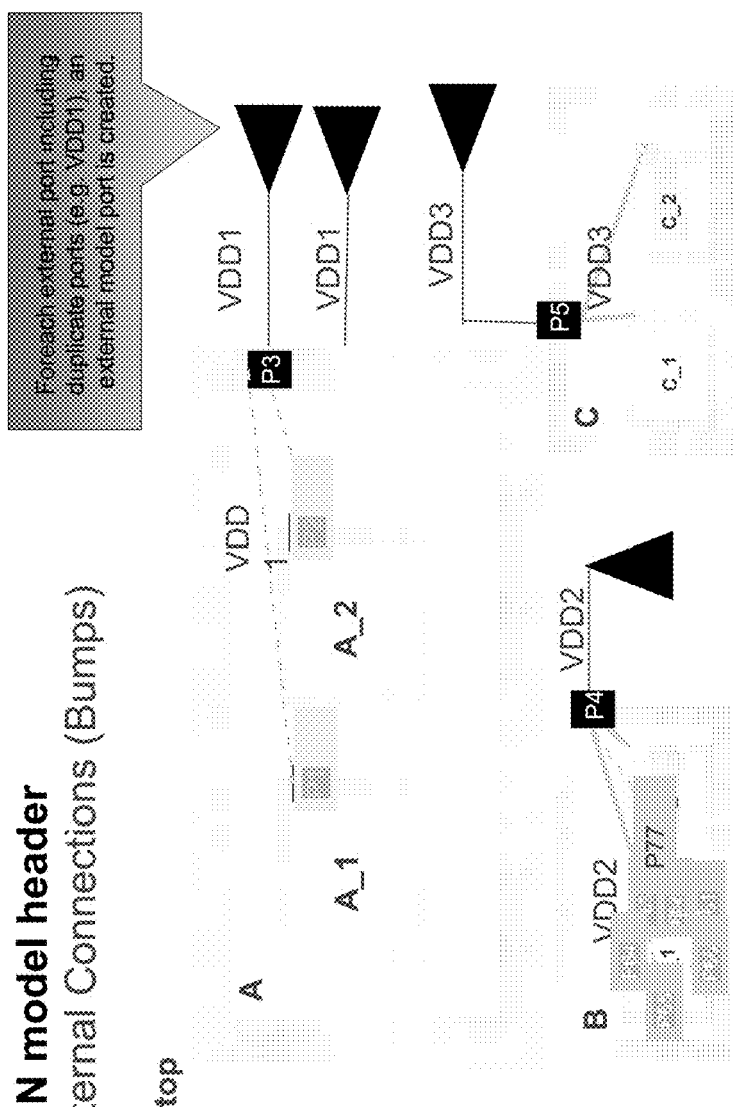
FIG. 20 illustrates a diagram showing the generation of a PDN model header to connect to external connections or bumps corresponding to one or more embodiments.

Referring also to FIG. 19, an example showing a PDN model header is provided. This example may be used to drive automatic connections to the PDN model. FIG. 20 shows an example where the external connections (bumps) for the PDN model header are provided. In this example, for each external port including duplicate ports (e.g. VDD1), an external model port may be created.

In some embodiments, the PDN model header may also include one or more internal connections. These are PDN connections to the instances inside the design hierarchy. For the hierarchical blocks, the model ports may be created at any level of the design hierarchy. If the port is created on the top level instance, each of the lower level blocks may be treated as black boxes, e.g. they are driven by the PDN model driver from the top cellview. If the ports are created at the lower level, these lower level connections are driven by the PDN model driver from the top cellview.

Figure 22:
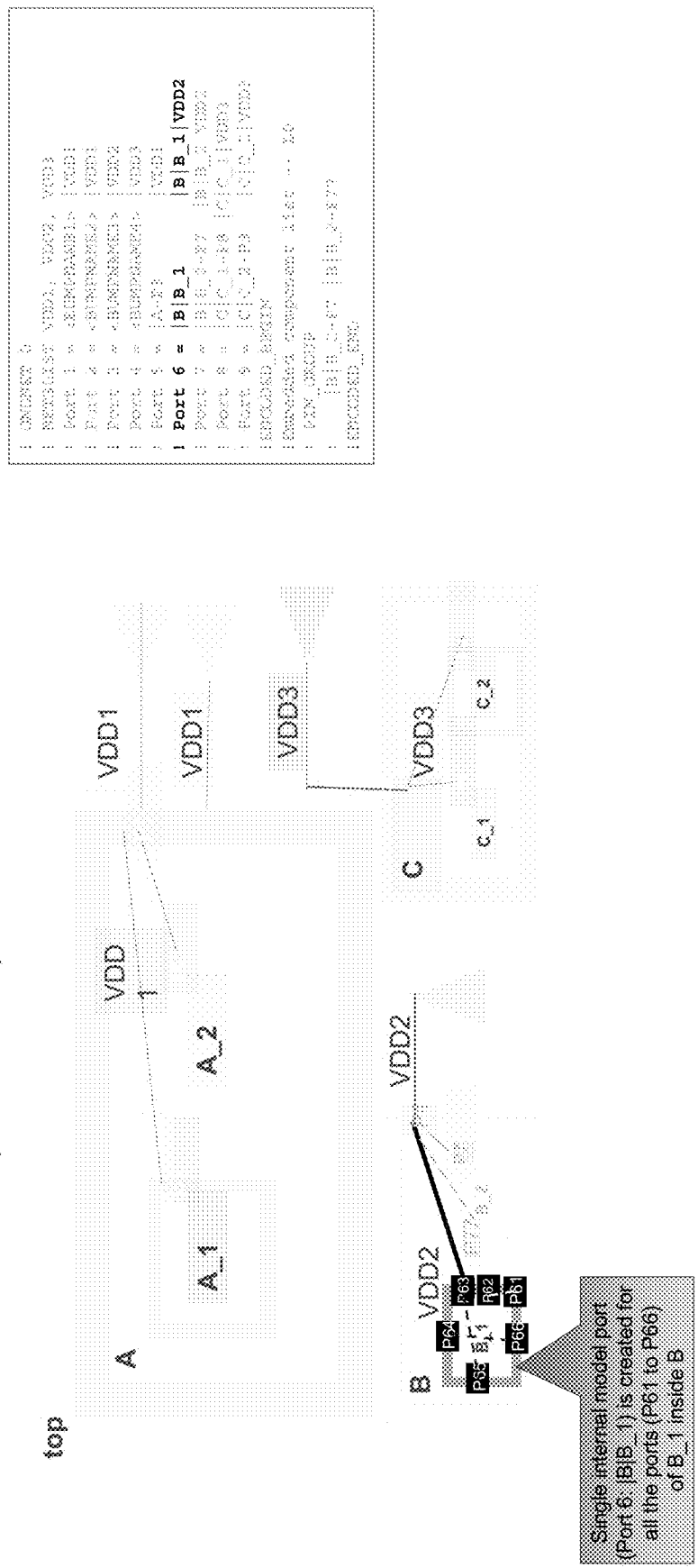
FIG. 22 illustrates a diagram showing the generation of a PDN model header to connect to internal connections at the lower-level corresponding to one or more embodiments.
Figure 23:
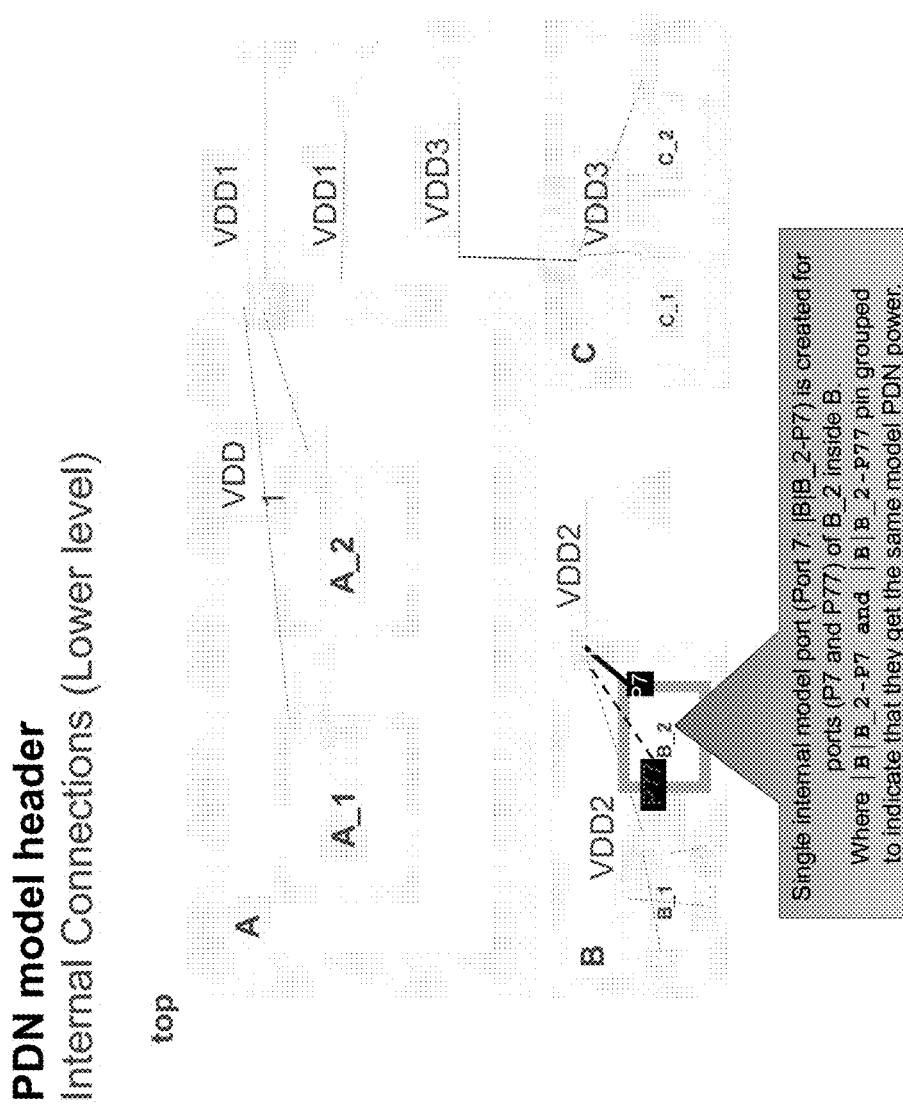
FIG. 23 illustrates a diagram showing the generation of a PDN model header to connect to internal connections at the lower-level corresponding to one or more embodiments.
Figure 24:
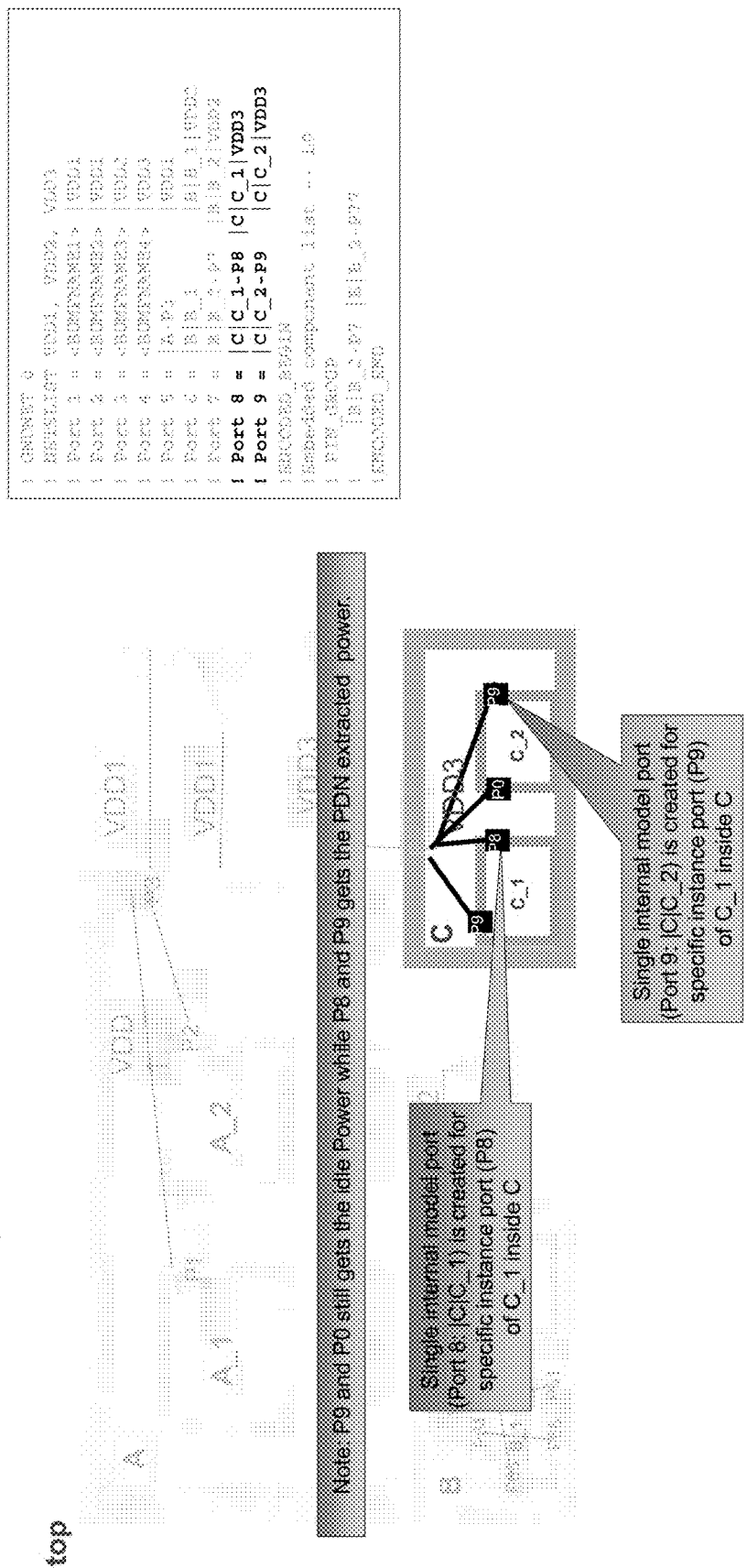
FIG. 24 illustrates a diagram showing the generation of a PDN model header to connect to internal connections at the lower-level corresponding to one or more embodiments.

Referring now to FIGS. 21-24, examples showing the internal connections at the top level are provided. One model port may be created for a hierarchical block instance A. FIG. 22 shows an example showing the internal connections at the lower level. Here, a single internal model port (Port 6: |B|B_1) is created for all the ports (P61 to P66) of B_1 inside B. FIG. 23 shows another example showing the internal connections at the lower level. Here, a single internal model port (Port 7: |B|B_2-P7) is created for ports (P7 and P77) of B_2 inside B. Where |B|B_2-P7 and |B|B_2-P77 pin grouped to indicate that they get the same model PDN power. FIG. 24 shows another example showing the internal connections at the lower level. Here, P9 and P0 still gets the idle Power while P8 and P9 gets the PDN extracted power. A single internal model port (Port 8: |C|C_1) may be created for specific instance port (P8) of C_1 inside C and a single internal model port (Port 9: |C|C_2) may be created for specific instance port (P9) of C_1 inside C. FIG. 25 shows an example including pin-based distribution of PG, instance level distribution of PG, and proximity driven pin-grouping.

Figure 26:
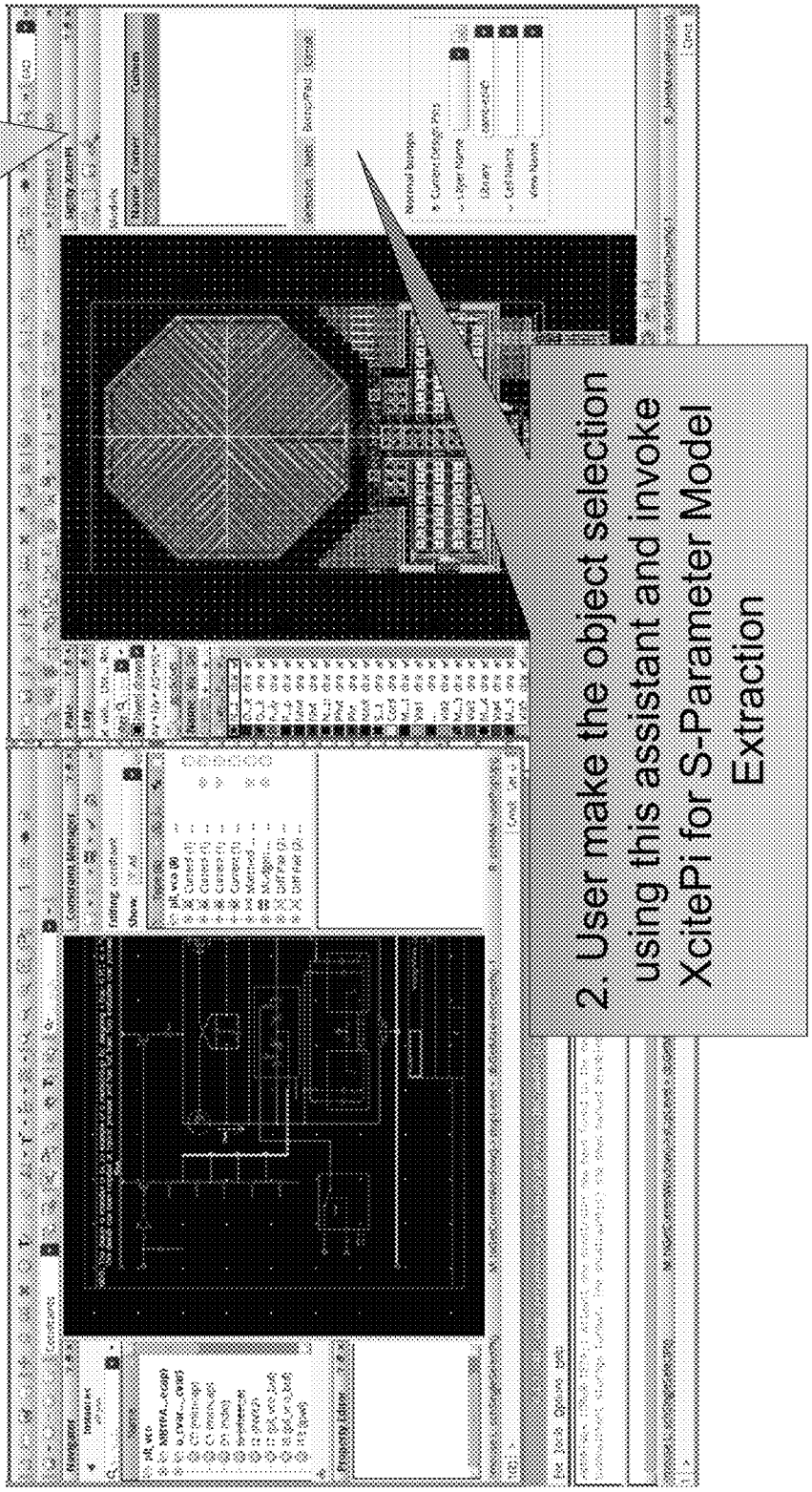
FIG. 26 illustrates a graphical user interface depicting object selection for model extraction corresponding to one or more embodiments.
Figure 27:
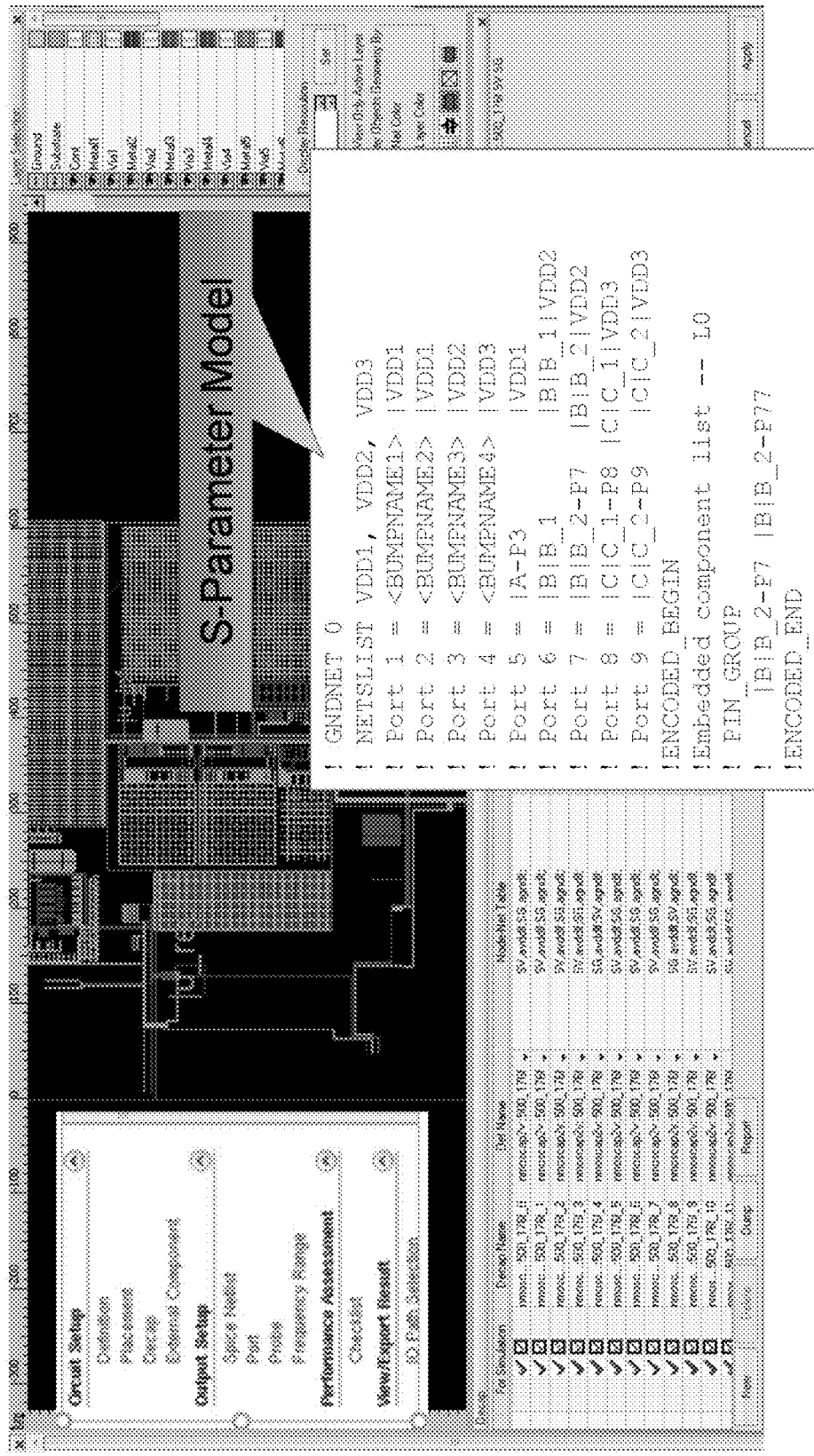
FIG. 27 illustrates a graphical user interface depicting extraction of s-parameter models corresponding to one or more embodiments.
Figure 28:
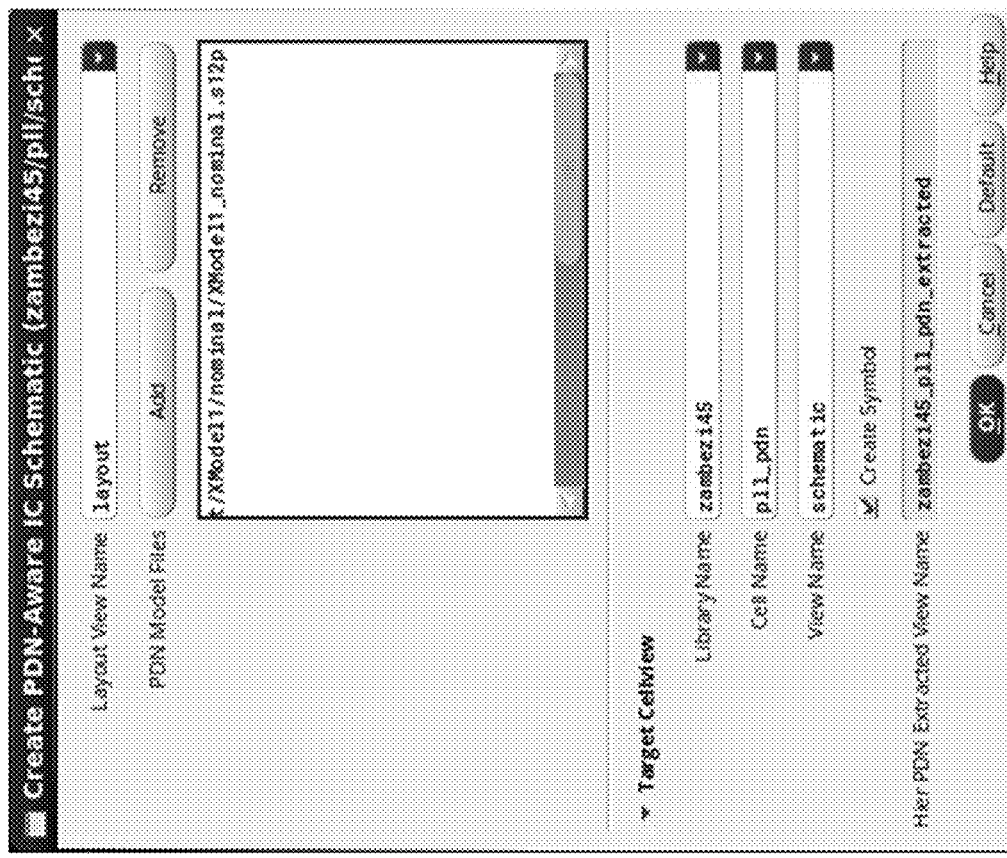
FIG. 28 illustrates a graphical user interface depicting a PDN model import form corresponding to one or more embodiments.
Figure 29:
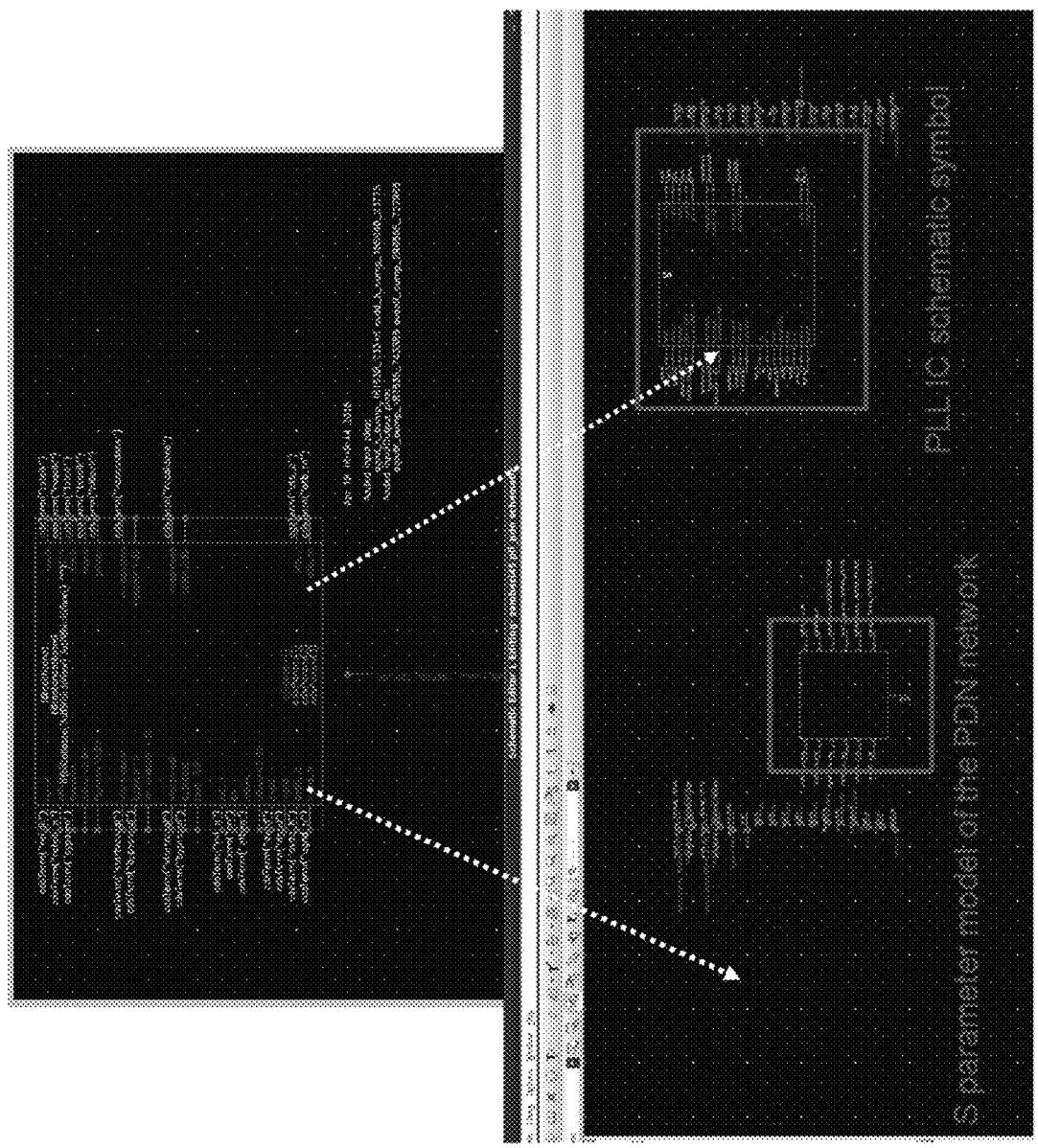
FIG. 29 illustrates a graphical user interface depicting a PDN aware top level schematic and symbol corresponding to one or more embodiments.
Figure 30:
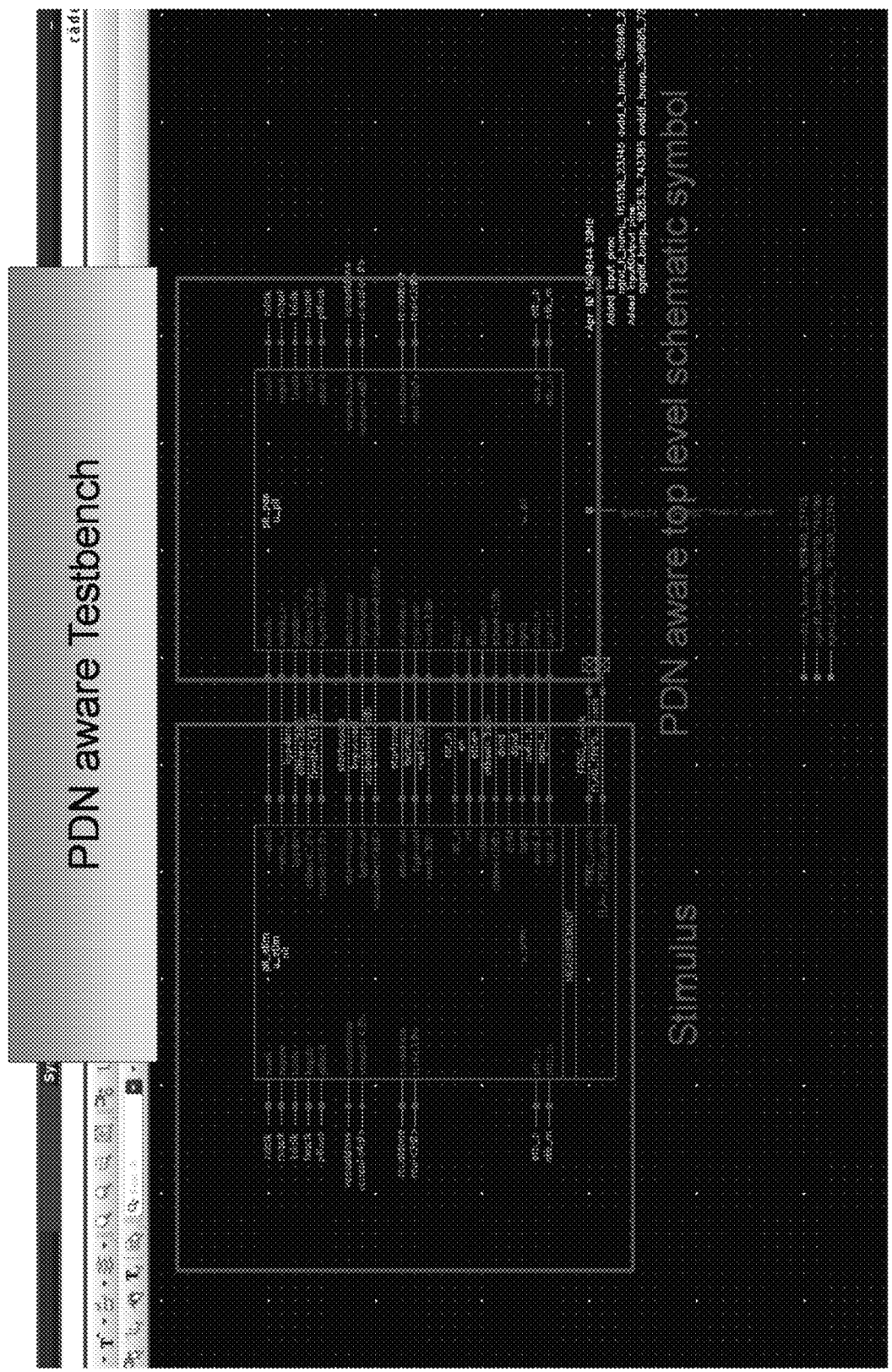
FIG. 30 illustrates a graphical user interface depicting the instantiation of a top level symbol in a system simulation test-bench corresponding to one or more embodiments.

Referring now to FIGS. 26-30, a number of graphical user interfaces consistent with embodiments of the present disclosure are provided. FIG. 26 displays a graphical user interface that may allow a user to visualize both the schematic and the layout. As shown in FIG. 27, the system may allow the user to extract one or more s-parameter models and make the object selection using at least a portion of the graphical user interface. FIG. 28 shows an example graphical user interface that may allow a user to import a PDN model. FIG. 29 shows a PDN aware top level schematic and symbol and FIG. 30 shows the instantiation of the top level symbol in the system simulation test-bench.

Figure 31:
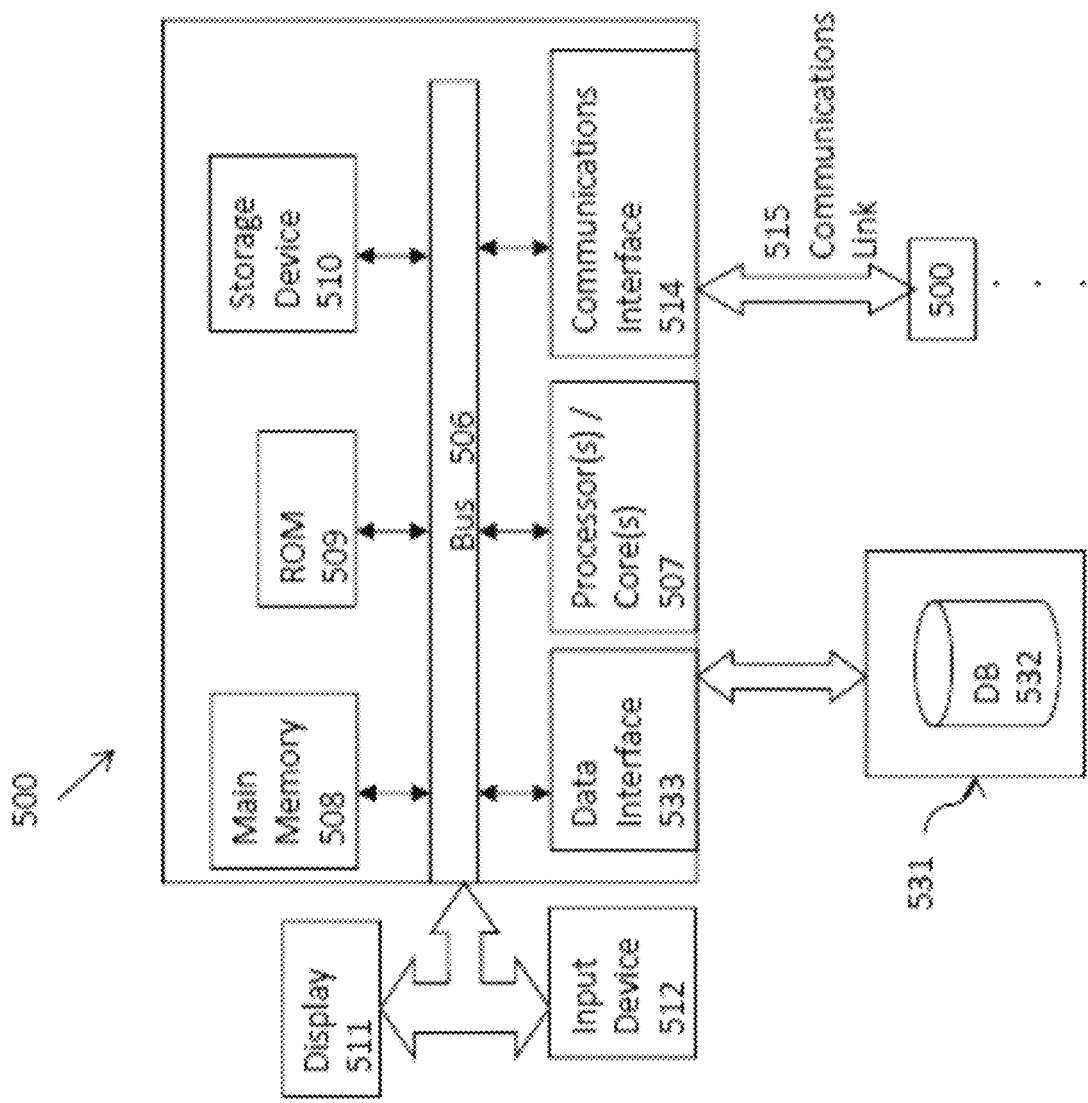
FIG. 31 illustrates a system diagram that may be used to implement one or more embodiments.

FIG. 31 illustrates a block diagram of an illustrative computing system 500 suitable for power-grid aware simulation of an IC-Package schematic as described in the preceding paragraphs with reference to various figures. Computer system 500 includes a bus 506 or other communication mechanism for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512 (e.g., keyboard), and cursor control (not shown).

According to one embodiment, computing system 500 performs specific operations by one or more processor or processor cores 507 executing one or more sequences of one or more instructions contained in system memory 508. Such instructions may be read into system memory 508 from another computer readable/usable storage medium, such as static storage device 509 or disk drive 510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 507, where the one or more processors, one or more processor cores, or combination thereof executes one or more threads. For example, various acts of identifying, various acts of determining, various acts of classifying, various acts of implementing, various acts of performing, various acts of transforming, various acts of decomposing, various acts of updating, various acts of presenting, various acts of modifying, etc. may be performed by one or more processors, one or more processor cores, or combination thereof.

A mechanisms described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a mechanism described herein may be implemented as an application-specific integrated circuit (ASIC) in some embodiments.

In these embodiments, a mechanism may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of mechanism. A mechanism described herein or an equivalent thereof may perform its respective functions alone or in conjunction with one or more other mechanisms. A mechanism described herein or an equivalent thereof may thus invoke one or more other mechanisms by, for example, issuing one or more commands or function calls. The invocation of one or more other mechanisms may be fully automated or may involve one or more user inputs.

The term "computer readable storage medium" or "computer usable storage medium" as used herein refers to any non-transitory medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500. According to other embodiments of the invention, two or more computer systems 500 coupled by communication link 515 (e.g., LAN, PTSN, or wireless network) may perform the sequence of instructions required to practice the invention in coordination with one another.

Computer system 500 may transmit and receive messages, data, and instructions, including program, e.g., application code, through communication link 515 and communication interface 514. Received program code may be executed by processor 507 as it is received, and/or stored in disk drive 510, or other non-volatile storage for later execution. In an embodiment, the computing system 500 operates in conjunction with a data storage system 531, e.g., a data storage system 531 that includes a database 532 that is readily accessible by the computing system 500. The computing system 500 communicates with the data storage system 531 through a data interface 533. A data interface 533, which is coupled with the bus 506, transmits and receives electrical, electromagnetic or optical signals that include data streams representing various types of signal information, e.g., instructions, messages and data. In embodiments of the invention, the functions of the data interface 533 may be performed by the communication interface 514. It also should be appreciated that the computer system 500 may be extended to a cloud-based computing system.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer-implemented method for use in an electronic design environment comprising:

providing, using at least one processor, an electronic circuit design including an integrated circuit ("IC") or package schematic;

generating a power distribution network ("PDN") based upon at least in part, the electronic circuit design including the IC or package;

obtaining a PDN model having one or more port mappings between one or more layout terminals and one or more schematic pin-names;

stitching the PDN model and the IC or package schematic into a combined PDN and IC or package schematic model, wherein stitching is performed without using a manual stitching process; and simulating the combined PDN and IC or package schematic model using the at least one processor.

2. The computer-implemented method of claim 1, further comprising:

identifying one or more VDD connections or GND connections associated with the IC or package schematic based upon, at least in part, the one or more schematic pin-names.

3. The computer-implemented method of claim 2, further comprising:

shorting the one or more VDD connections or GND connections associated with the IC or package schematic.

4. The computer-implemented method of claim 2, wherein identifying is based upon at least one of analyzing a hierarchical schematic or a top-level schematic.

5. The computer-implemented method of claim 4, further comprising:
transferring the one or more VDD connections or GND connections from the hierarchical schematic to the top-level schematic to generate an updated top-level schematic having one or more updated interfaces.

6. The computer-implemented method of claim 5, further comprising:
stitching the PDN model with the updated interfaces.

7. The computer-implemented method claim 6, further comprising:
stitching the PDN model with one or more non-VDD connections or non-GND connections.

8. A non-transitory computer-readable storage medium having stored thereon instructions that when executed by a machine result in the following operations:
providing, using at least one processor, an electronic circuit design including an integrated circuit ("IC") or package schematic;
generating a power distribution network ("PDN") based upon at least in part, the electronic circuit design including the IC or package;
obtaining a PDN model having one or more port mappings between one or more layout terminals and one or more schematic pin-names;
stitching the PDN model and the IC or package schematic into a combined PDN and IC or package schematic model, wherein stitching is performed without using a manual stitching process; and
simulating the combined PDN and IC or package schematic model using the at least one processor.

9. The non-transitory computer-readable storage medium of claim 8, further comprising:
identifying one or more VDD connections or GND connections associated with the IC or package schematic based upon, at least in part, the one or more schematic pin-names.

10. The non-transitory computer-readable storage medium of claim 9, further comprising:
shorting the one or more VDD connections or GND connections associated with the IC or package schematic.

11. The non-transitory computer-readable storage medium of claim 9, wherein identifying is based upon at least one of analyzing a hierarchical schematic or a top-level schematic.

12. The non-transitory computer-readable storage medium of claim 11, further comprising:
transferring the one or more VDD connections or GND connections from the hierarchical schematic to the top-level schematic to generate an updated top-level schematic having one or more updated interfaces.

13. The non-transitory computer-readable storage medium of claim 12, further comprising:
stitching the PDN model with the updated interfaces.

14. The non-transitory computer-readable storage medium of claim 13, further comprising:
stitching the PDN model with one or more non-VDD connections or non-GND connections.

15. A system for use in an electronic design environment comprising:
a computing device having at least one processor configured to provide an electronic circuit design including an integrated circuit ("IC") or package schematic and to generate a power distribution network ("PDN") based upon at least in part, the electronic circuit design including the IC or package, the at least one processor further configured to obtain a PDN model having one or more port mappings between one or more layout terminals and one or more schematic pin-names and to stitch the PDN model and the IC or package schematic into a combined PDN and IC or package schematic model, wherein stitching is performed without using a manual stitching process, the at least one processor further configured to simulate the combined PDN and IC or package schematic model using the at least one processor.

16. The system of claim 15, wherein the at least one processor is further configured to identify one or more VDD connections or GND connections associated with the IC or package schematic based upon, at least in part, the one or more schematic pin-names.

17. The system of claim 16, wherein the at least one processor is further configured to short the one or more VDD connections or GND connections associated with the IC or package schematic.

18. The system of claim 16, wherein identifying is based upon at least one of analyzing a hierarchical schematic or a top-level schematic.

19. The system of claim 18, wherein the at least one processor is further configured to transfer the one or more VDD connections or GND connections from the hierarchical schematic to the top-level schematic to generate an updated top-level schematic having one or more updated interfaces.

20. The system of claim 19, wherein the at least one processor is further configured to stitch the PDN model with the updated interfaces.

* * * * *